United States Patent [19]

Dlugos et al.

[11] 4,271,470

[45] Jun. 2, 1981

[54] SERIAL DATA BUS FOR USE IN A MULTIPROCESSOR PARCEL POSTAGE METERING SYSTEM

[75] Inventors: Daniel F. Dlugos, Huntington, Conn.; Donald D. Harenberg, Placentia, Calif.

[73] Assignees: Pitney Bowes Inc., Stamford, Conn.; Rockwell Intl. Corp., El Segundo, Calif.

[21] Appl. No.: 13,757

[22] Filed: Feb. 21, 1979

[51] Int. Cl.³ .................... G06F 15/20; G06G 19/40
[52] U.S. Cl. ................................. 364/466; 364/200; 364/567; 177/25
[58] Field of Search .............. 340/146.1 BA; 364/200, 364/900, 466, 567; 177/25; 371/34

[56] References Cited

U.S. PATENT DOCUMENTS

| | | | |
|---|---|---|---|
| 3,234,518 | 2/1966 | Rakoczi et al. | 340/146.1 BA |
| 3,427,585 | 2/1969 | Milford | 340/146.1 BA |
| 3,551,885 | 12/1970 | Henzel | 340/146.1 BA |
| 3,582,880 | 6/1971 | Beausoleil et al. | 340/146.1 BA |
| 3,680,045 | 7/1972 | Meidan | 340/146.1 BA |
| 3,805,234 | 4/1974 | Masters | 340/146.1 BA |
| 4,091,449 | 5/1978 | Meckstroth et al. | 364/466 |
| 4,096,572 | 6/1978 | Namimoto | 364/200 |
| 4,120,029 | 10/1978 | Steiner | 364/200 |
| 4,149,242 | 4/1979 | Pirz | 364/200 |
| 4,181,946 | 1/1980 | Loshbough et al. | 364/466 |
| 4,229,794 | 10/1980 | Foster | 364/466 |

*Primary Examiner*—Charles E. Atkinson
*Attorney, Agent, or Firm*—Mark Levy; William D. Soltow, Jr.; Albert W. Scribner

[57] ABSTRACT

A multiprocessor parcel postage metering system includes a system processor to which a scale subsystem processor, a postage printing subsystem processor, and a peripherals subsystem processor may be connected. The processors share a common data bus over which data is transferred serially. The system processor accepts weight and status data transmitted from the scale subsystem processor over the serial data bus. The system processor operates on this data and keyboard entry data to calculate required postage as a function of parcel origin, parcel destination, class of service and selected special fees. Printer setting data is transferred to the postage printing subsystem processor over the serial data bus. Peripheral devices, such as a document printer or a parcel identification number counter, are controlled by data sent to the peripherals subsystem processor over the serial data bus. Each transmission is verified by returning the complemented form of a transmitted word to the sending processor. The sending processor compares the transmitted word with the returned word and sends out the next word only if a match is found.

3 Claims, 9 Drawing Figures

SERIAL DATA BUS FOR USE IN A MULTIPROCESSOR PARCEL POSTAGE METERING SYSTEM

BACKGROUND OF THE INVENTION

This application is related to copending application entitled "Multiprocessor Parcel Postage Metering System Having Serial DAta Bus," Ser. No. 013,734, filed Feb. 21, 1979, and assigned to the assignee of the present application.

The present invention relates to postage meters and more particularly to a multiprocessor parcel postage metering system which includes data verification.

A number of different devices and systems have been developed to help a user determine the proper postage for mailing parcels. The simplest of these devices is, of course, a scale which provides visual display of the parcel weight. The operator must translate this weight reading to a postage amount by resort to printed rate charts and special fee charts. The user then applies the postage to the parcel either in the form of stamps or in the form of an adhesive-backed tape printed with the user-calculated postage by a conventional postage meter.

This simple arrangement may be suitable for a conscientious user who mails few parcels over a given period of time. However, if the user isn't conscientious, he may misread the scale or misread the rate charts and incorrectly calculate the required amount of postage. If the postage which the user calculates is insufficient, the parcel may be returned to its sender, delaying ultimate delivery. If the calculated postage is excessive, the parcel will be delivered but the user will have wasted his money. Moreover, this approach to mailing parcels is time consuming and cannot be effectively used where any significant number of parcels is to be mailed on a regular basis.

To reduce the chances of human error, it would be possible to develop a completely mechanical parcel metering system in which the displacement of a scale platform could be mechanically translated to a particular postage amount for a given class of service. The calculated postage could then be applied manually either as stamps or as a postage meter imprinted tape. The limitations of such a system are clear. The system would have to be kept simple by limiting its use to a particular class of service. The mechanical construction required to handle several classes of mail would be incredibly complex making such a device difficult to build and difficult to maintain. Moreover, a mechanical structure could not be easily updated to reflect changes in postal rates or regulations.

Many of the above-discussed problems are overcome in a parcel postage metering system disclosed in U.S. Pat. No. 3,692,988, issued Sept. 19, 1972 and assigned to the assignee of the present invention. That system employs both electromechanical and electronic technologies to generate postage-representing signals as a function of a manually-entered class of service, a manually-entered zone and a parcel weight input to the system in the form of signals from a scale mechanism. This data is used to access a postage memory wherein postage representations are stored as a function of the input data.

The system described above is a highly effective and useful system. However, developments in solid state technology have made it possible to consider a system in which the major components of the system are controlled by individual processors. For example, the scale mechanism would be controlled by its own processor as would the device for setting the meters. Such a multiprocessor system would be considerably more versatile that known parcel postage metering systems. This system could be programmed to handle different classes of service, different special fees and changes in the postal regulations.

One problem with a multiprocessor system is that data being transferred between the different processors of the system is subject to distortion due to electrical noise voltages. Prior art system have generally employed parallel data busses and elaborate error checking schemes to assure the integrity of the data. While the conventional data transfer arrangements may be suitable for high speed, large scale multiprocessor systems, the cost and complexity of such arrangements have rendered them impractical for use in systems such as a multiprocessor parcel postage metering system.

SUMMARY OF THE INVENTION

The present invention is a multiprocessor parcel postage metering system which includes a simple error checking method for assuring the integrity of transferred data.

A multiprocessor postage metering system constructed in accordance with this invention includes a system processor, a scale subsystem processor for providing scale weight and status data and a postage printing subsystem processor for accepting postage printer setting data and for providing printer status data. The system further includes attention lines connecting the system processor to the various subsystem processors for enabling the system processor to initiate data transfers, acknowledgement lines by which a subsystem processor can acknowledge an attention signal, readly lines for conditioning a selected one of the processors to receive transmitted data and a serial data bus. The system further includes means for verifying the correct transmission of each fixed-length data word before transmitting the next data word.

DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

DESCRIPTION OF THE PREFERRED EMBODIMENT OF THE INVENTION

Figure 1:
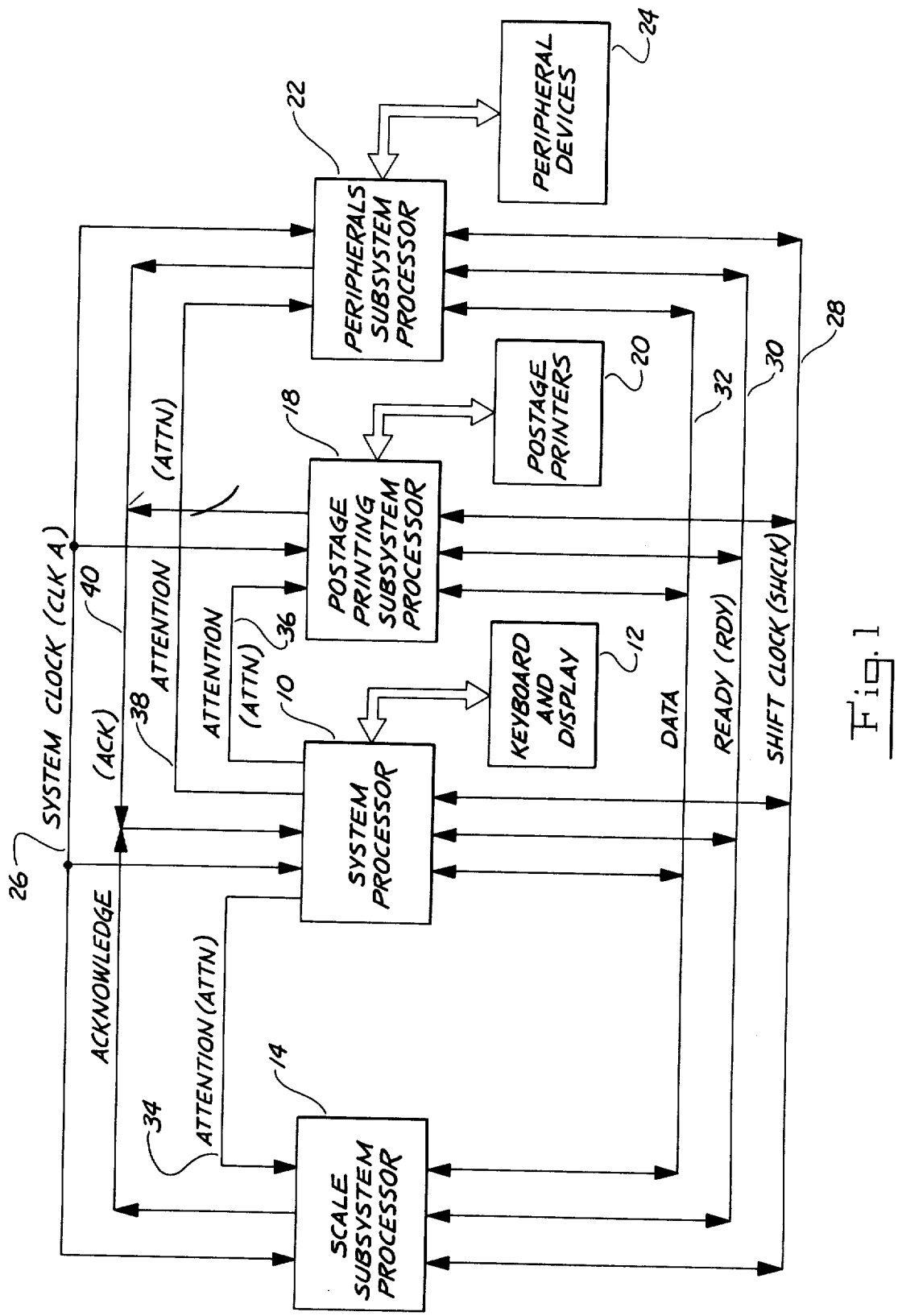
FIG. 1 is a block diagram of the major components of a multiprocessor system incorporating the present invention.

Referring to FIG. 1, the central component of the multiprocessor parcel postage metering system shown there is a system processor 10 which interfaces with a system user through an input/output subsystem 12 including a keyboard and a visual display. In a preferred embodiment of the invention, the keyboard is used to enter data concerning class of service, destination zone, special fees and the like. In one embodiment of the invention, the first three digits of the zip codes for the point of origin and point of destination of a parcel may be entered through the keyboard. A zip-to-zone subroutine programmed into the system processor would convert the entered data to zone information. The display may be a seven-segment digit display indicating the weight of a parcel in pounds and ounces or (in the metric system) kilograms and grams, its destination zone and the required postage. In a preferred embodiment, the system would provide visual error codes to inform the user of certain types of system errors.

The system processor 10 is adapted to receive weight-indicating signals from a scale subsystem processor 14 which provides an encoded weight signal representing a parcel weight in English or metric units.

The system processor 10 is also connected to a postage printing subsystem processor 18 which sets and operates one or more postage printers 20. The connection between the postage printing subsystem processor 18 and the postage printers 20 is shown as bidirectional since the postage printers include sensors which supply signals to the subsystem processor representing the current setting of each printer.

The system processor 10 may also communicate with a peripherals subsystem processor 22 which can control and monitor a number of peripheral devices 24, including, for examples, a parcel identification number counter of the type used for United Parcel Service postage transactions, a document printer which would provide a written record of the postage transactions occurring within the system, and a floppy disc unit or magnetic tape unit for providing magnetic record storage of the system transactions.

Operations within the multiprocessor system are controlled by system clock signals generated within the system processor 10 and applied to the processors 14, 18, and 22 over a common clock bus 26.

Other connections from the system processor 10 which are common to the other processors in the overall system include a shift clock (SHCLK) bus 28, a ready (RCY) bus 30 and the serial data bus 32. Each of these busses is bidirectional. That is, signals may be generated either at one of the subsystem processors 14, 18 or 22 and sent via the appropriate bus to the system processor 10 or at the system processor 10 and sent over the same bus to one of the subsystem processors. The form and function of each of the above-identified signals is described in more detail later. Generally, the SHCLK signals carried by bus 28 are used in shifting data from a transmitting processor to a receiving processor. The RDY signals on bus 30 provides a signal to the receiving processor that the transmitting processor is enabled to transmit binary data over the serial data bus 32.

Interprocessor communications are controlled by the system processor 10 which, operating under the control of a stored program, addresses any of the other processors with which data is to be exchanged by means of an attention (ATTN) signal. Individual connections from the system processor to the other processors carry these ATTN signals. Unlike the other earlier-discussed busses, each ATTN line runs between the system processor 10 and only one of the subsystem processors in the system. More specifically, ATTN line 34 connects the system processor 10 to the scale subsystem processor 14, ATTN line 36 connects system processor 10 to the postage printing subsystem processor 18 and ATTN line 38 connects the peripherals subsystem processor 22 to the system processor 10. Additional ATTN lines may be provided using ordinary multiplexing techniques in order to allow the system processor 10 to control additional subsystem processors (not shown), if desired.

Each of the subsystem processors 14, 18 and 22 can respond to an ATTN signal transmitted over its dedicated attention line by returning an acknowledge (ACK) signal to the system processor over a common bus 40. The bus 40 can be shared by the subsystem processors since it can logically be assumed that only the subsystem processor which is being addressed over its dedicated attention line will be replying with an ACK signal. The form and function of each of these signals will also be described in more detail later.

Figure 2:
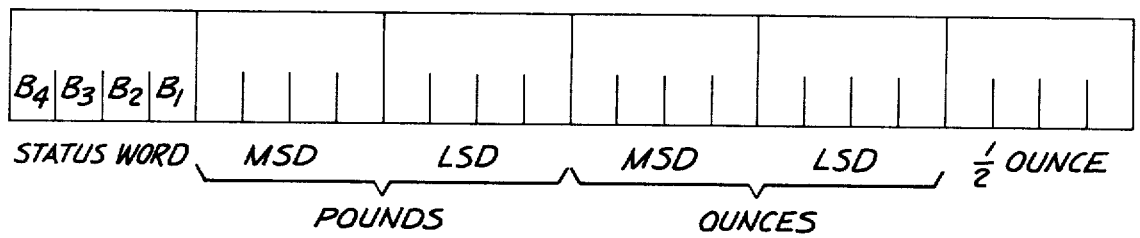
FIG. 2 shows the format of a message transmitted from a scale processor to the system processor.

The format for data transferred from the scale processor 14 to the system processor 10 is shown in FIG. 2. Scale data is transmitted over the serial data bus in a six word message comprising one status word and five weight information words. Each word in the message is four bits long. The five weight information words present information in binary coded decimal of BCD format. In a preferred embodiment, the scale is capable of resolving parcel weight to the nearest half ounce or (in the metric system) to the nearest five grams. Therefore, the last or least significant word in the message format is always 0101 (representing a half ounce or five grams) or 0000, indicating the parcel weight is rounded to the nearest full ounce or ten grams.

The status word is a four bit word used to convey information about scale operation from the scale subsystem processor 14 to the system processor 10. In one embodiment of the invention, the most significant bit B4 of the status word is used to identify the type of scale from which weight information is being transmitted. Depending upon its intended use, the system may be concurrently connected to a scale having a relatively small capacity, such as 12 pounds, and to a scale having larger capacity such as 25 pounds or 70 pounds. The system distinguishes between the 12 pound scale and the other two scales since different data processing steps are required.

Bit $B_3$ is a data validation bit which must possess a predetermined binary value before the system processor will accept the weight information in the message as valid. A data validation bit is necessary in the status word since the sacle processor will always supply weight information to the system processor upon command without regard to whether the sacle has reached an equilibrium condition. The value of bit $B_3$ indicates to the system processor whether the scale is still moving, and therefore generating invalid weight signals, or whether it has reached a steady state or equilibrium condition in which valid weight readings can be taken.

Bit $B_2$ of the status word is an "overweight" bit which indicates to the system processor whether the parcel weight has exceeded the maximum weight which the scale can normally be expected to measure. This bit inhibits the system for treating an overweight package as if it weighed the maximum possible scale weight.

Bit $B_1$ of the status word is a sign bit which is used in checking scale calibration. A negative scale weight reading, preferably indicated by binary 1 in this bit position of the status word, would indicate that the scale needs to be recalibrated.

The above-described functions of the individual bits in the status word presumes the scale is operating normally. The status word can also be presented by the scale subsystem processor to indicate a malfunction in either the scale element or in the scale processor connected to that element. For example, setting the status word to 1111 might be used to indicate a weighing malfunction while a status word of 0111 might be used to indicate a scale subsystem processor malfunction.

Figure 3:
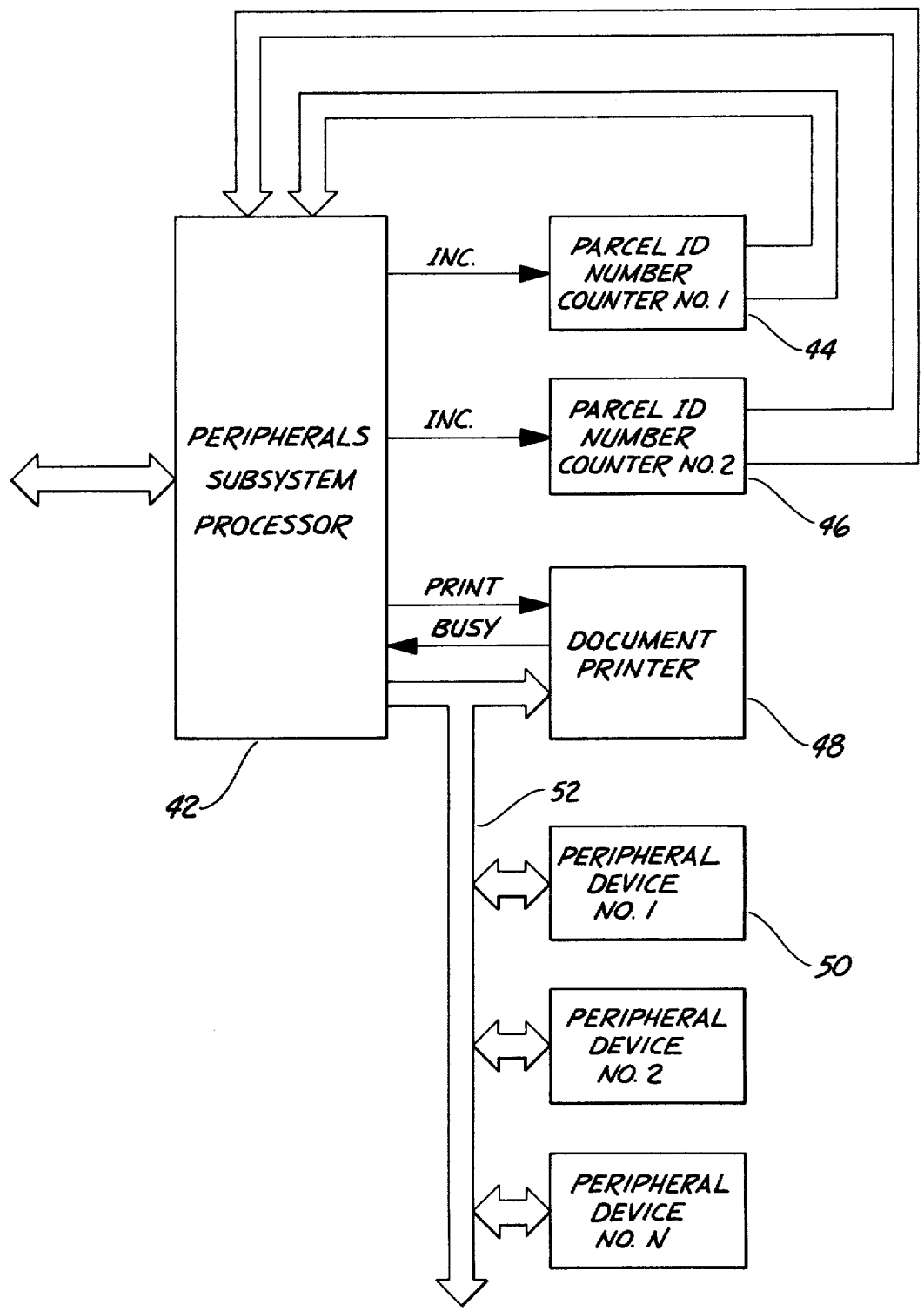
FIG. 3 is a general block diagram of the peripherals subsystem processor, showing output devices which can be controlled by the processor.

Less sophisticated embodiments of the multiprocessor parcel postage metering system might include only the hardware described with reference to the foregoing figure. A more sophisticated embodiment could include a peripheral devices subsystem of the type shown generally in FIG. 3. Such a subsystem would include a peripherals subsystem processor 42 for controlling and monitoring the operation of peripheral devices such as a first parcel identification number counter, 44, a second parcel identification number counter 46 and a document printer 48. The processor 42 might also be used to control a number of other peripheral devices, such as device 50, through a parallel data bus 52. The types of peripheral devices which may be connected to the parallel data bus 52 include journal printers for printing transaction summaries, magnetic tape units for providing bulk magnetic storage of postage transactions, and modems for transmitting postage transaction data to remote locations.

The parcel identification number counters 44 and 46 are used only in conjunction with UPS postage transactions. The counter is incremented for each UPS register tape produced by an associated printing device. Provision is made for two such counters since the multiprocessor system may be adapted to drive two UPS printing devices under special conditions rather than the more common arrangement of one UPS postage printer.

The peripherals subsystem processor 42 provides only an Increment signal to the counters 44 and 46. The counter itself generates a four digit binary coded decimal number which is fed back to the processor 42 to be printed by the document printer 48 and recorded on other peripheral devices as appropriate.

Figure 5:
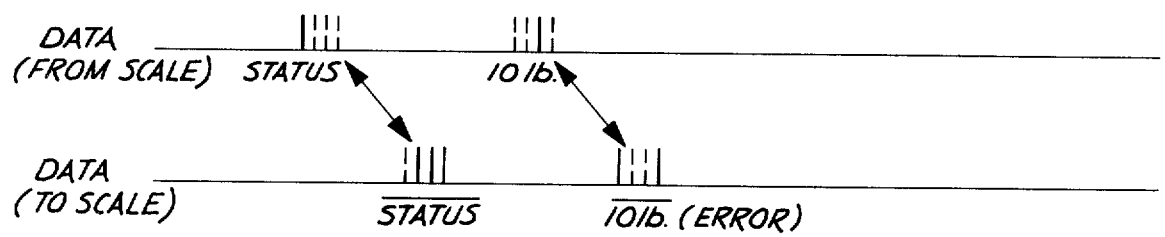
FIG. 5 shows signal wave forms which would be generated in an erroneous data transmission were to occur.

A fixed message format is employed in transmitting data via the serial data bus from a given processor to another processor in the system. FIG. 5 is a chart of the signal wave forms which would exist during transmission of data from a scale processor to the system processor. The scale data is transmitted as four bit words in a message which is normally six words long. The words are transmitted one bit at a time with the most significant bit being transmitted first. Each word is verified by the receiving processor before the next word is sent.

Figure 4:
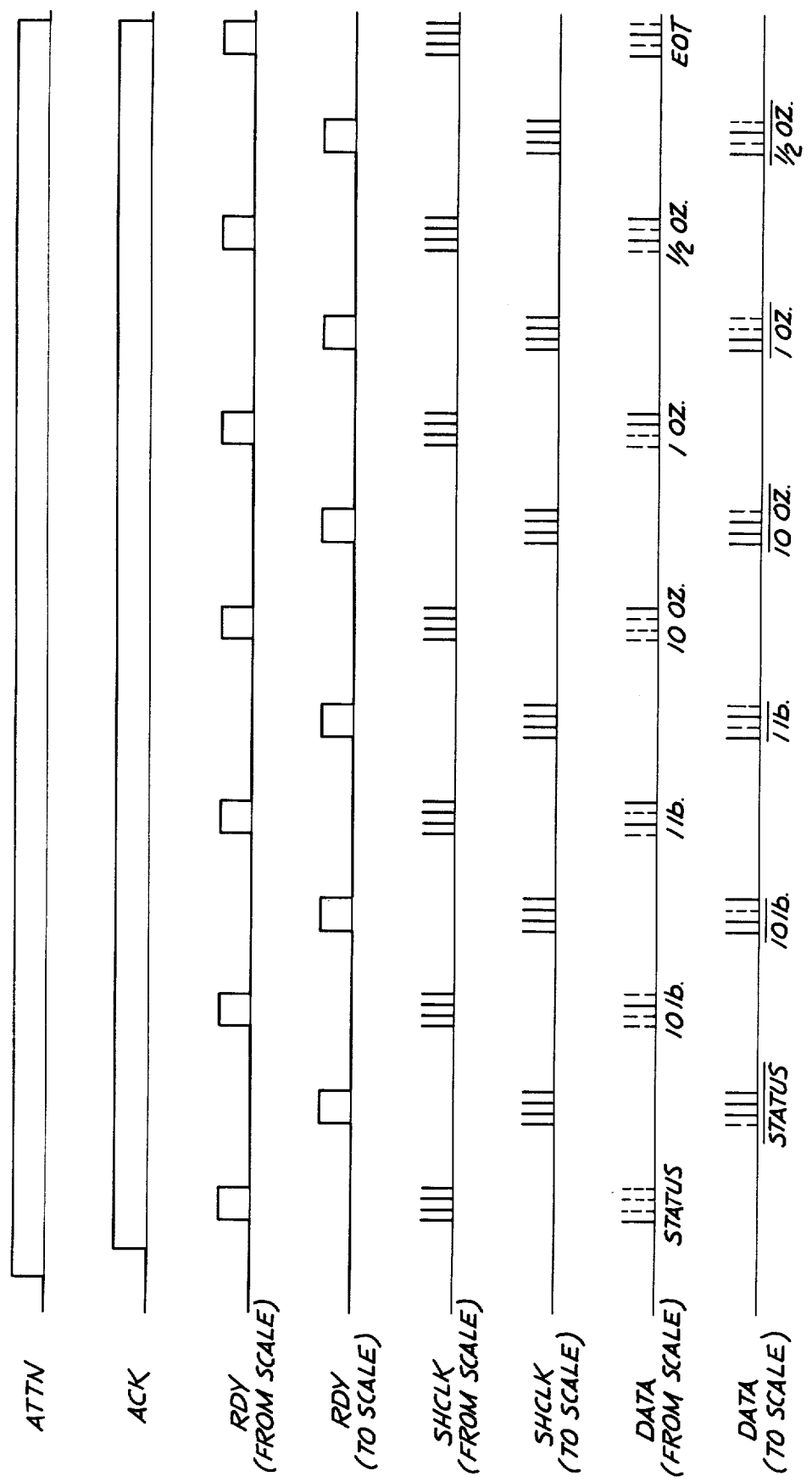
FIG. 4 shows a number of signal wave forms which would be generated during a transfer of data from a scale subsystem processor to the system processor.

Referring to FIG. 4, communication between the scale processor and the system processor is initiated by the system processor by raising the signal on the ATTN line to a binary one level. The scale processor senses the raised ATTN signal and responds by raising the acknowledgment or ACK signal. The scale processor then raises the signal on the RDY line and clocks the first four bit word onto the serial data bus at a rate determined by the SHCLK pulses. The first word transmitted is the status word described with reference to FIG. 2. The scale processor then drops the signal on the RDY line to a binary zero level. When the system processor detects the binary zero condition on the RDY line, it reads and stores data from a buffer register connected to the serial data bus.

The system processor complements the status word, as received, and transmits the complemented form back to the scale processor by first raising the RDY line and then shifting the complemented form back to the scale processor by first raising the RDY line and then shifting the complemented word one bit at a time onto the serial data bus at the SHCLK pulse rate. The system processor will drop the signal on the RDY line after clocking out the four bits of the complemented words. When the scale processor senses that the RDY line has returned to a binary zero level, it reads and compares the complemented status word received from the system processor with the status word received from the system processor with the status word originally transmitted to the system processor.

The comparison can be accomplished by a number of techniques. A preferred technique is to add the originally transmitted status word to the word transmitted back from the system processor and to then increment the result by one. If the originally transmitted word and the re-transmitted word are complementary, the result would be a 10000 binary word.

If the comparison shows that the status word was successfully transmitted, the scale processor raises the signal level on the RDY line to a binary 1 level and transmits the BCD word representing the largest weight increment of the parcel being weighed by the scale. The system processor reads and stores the four bits of the received word and re-transmits the complement of that word back to the scale processor where it is compared with the originally-transmitted word using the same technique employed to test the transmission of the status word.

The above-described process for transmitting data is repeated for the four bit words representing the smaller weight increments. Each transmitted four bit word is verified by retransmitting the complemented form of the word as received at the system processor and by comparing the two forms at the scale processor.

If all scale processor transmissions have been received correctly by the system processor, the scale processor transmits an end-of-transmission code(1010) following verification of the last word of the message. The scale processor then drops the signal on the ACK line to a binary zero level. In response, the systems processor drops a signal on the ATTN line to a binary zero and maintains that level until a decision is again made to interrogate the scale processor.

The preceding description of a data transfer from the scale processor to the system processor assumes that all data words were correctly received at the system processor. The signals which would be generated in the event of an erroneous transmission are illustrated with reference to FIG. 5. In FIG. 5, the system processor has correctly signaled the scale processor to begin a transfer by raising the ATTN line. The scale processor has properly acknowledged the ATTN signal by raising the ACK line and by generating a RDY pulse. During the RDY pulse, the status word for the scale is shifted one bit at a time onto the serial data bus. It is assumed that the system processor has correctly received a status word and has retransmitted to the scale processor the complement of the status word.

When, however, the scale processor transmits a 0010 signal to indicate that the parcel weight is at least 20 pounds but less than 30 pounds, the system processor is shown as transmitting an improper 1001 signal in return. When the scale processor reads the retransmitted signal and compares it to the originally transmitted signal, the lack of correspondence between the two signals will cause the scale processor to drop the signal on the ACK line at the time the next RDY signal would have been expected. The system processor continually monitors the ACK lines and the RDY lines. If the signal on the ACK line drops before the signal on the RDY line, the system processor interprets this sequence as signifying an error in transmission. To terminate the data transfer, the system processor will then drop the signal on the ATTN line. Dropping signals on both the ATTN line and the ACK line will always be interpreted as an end-of-data transfer.

The protocol for transmitting data from the system processor to either the postage printer subsystem processor or the peripherals subsystem processor differs slightly from the protocol employed in transferring data from the scale processor to the system processor.

Figure 6:
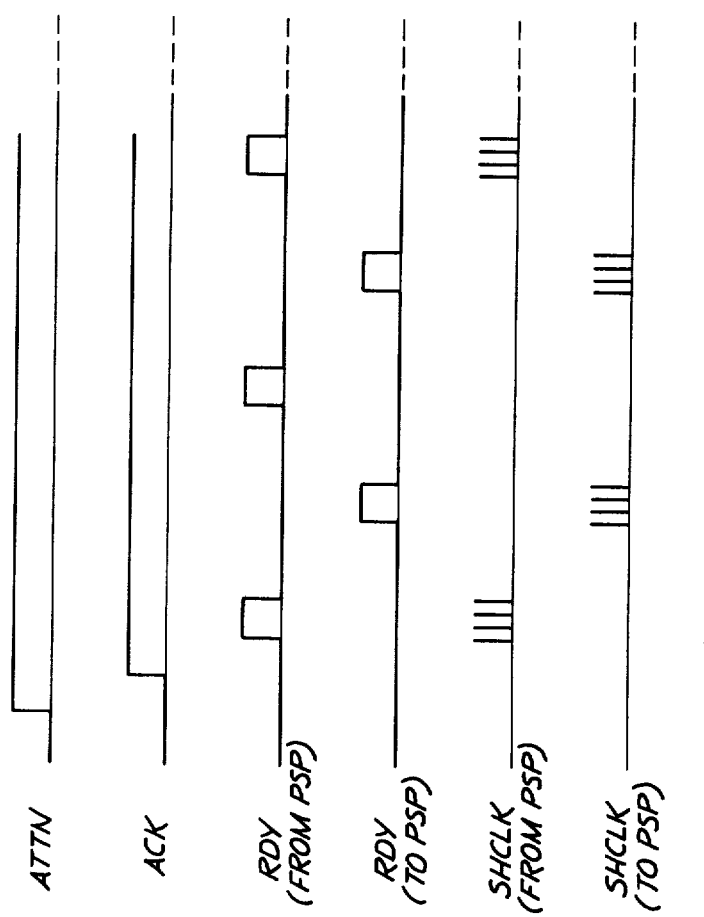
FIG. 6 shows signal wave forms which would be generated during the initial phases of an exchange of data between the system processor and the peripherals subsystem processor.

Waveforms generated in a data exchange with the peripherals subsystem processor (PSP) are shown in FIG. 6. The subsystem processor is addressed by the system processor by raising the signal on the ATTN line. A four bit status word is then transmitted to the system processor. The system processor retransmits the complement of the received status word to the subsystem processor where it is compared to the originally transmitted word. AS set forth earlier, if the scale processor were involved, a successful comparison would result in the first four bit data word being shifted onto the serial data bus for transmission to the system processor. For interprocessor communications involving either the postage printer subsystem or the peripherals subsystem, the data is generally transferred in the opposite direction; i.e., from the system processor to the subsystem processor. To allow for this difference, the postage printer and peripherals processor transmit a RDY pulse to the system processor if it has been verified that the status word or words have been correctly transmitted. When the system processor detects this RDY pulse, the first four bit data or command word is clocked onto the data bus to the addressed subsystem.

As would be expected, the roles of the system processor and the postage printing and peripherals processors are reversed relative to the roles played by the system processor and the scale processor. Where the scale processor is addressed, the system processor returns the complemented form of a data word received from the scale processor; where the postage printing processor or the peripherals subsystem processor is involved, the system processor transmits the original data word and the subsystem processor returns the complemented form.

If the entire message is sent correctly, the system processor pulses the RDY line before dropping the ATTN signal to the addressed subsystem processor. The subsystem processor then drops the ACK signal to acknowledge that the data transfer is complete. If however, the comparison performed by the system processor indicates that a transmission error has occurred, the system processor drops the ATTN line before the RDY line would be expected to go high. The addressed subsystem processor responds by dropping the ACK signals to the system processor. An end-of-data transfer is always considered to be indicated by the dropping of either the ATTN signal to the addressed subsystem processor or of the ACK signal provided by the processor.

From the foregoing, it can be appreciated that the present invention not only provides a highly effective and reliable means of verifying the transmission and receipt of data words during interprocessor communications, but further provides assurance that a processor which has been addressed during a data communications exchange is actively operating on the received data since the addressed processor must manipulate the data received thereby in order to return the complemented form of the data word. This feature of the invention is particularly important in systems where security of data exchange is a prime consideration, as in postage metering where errors in the exchange of monetary data result in financial loss or costly accounting errors.

Figure 7:
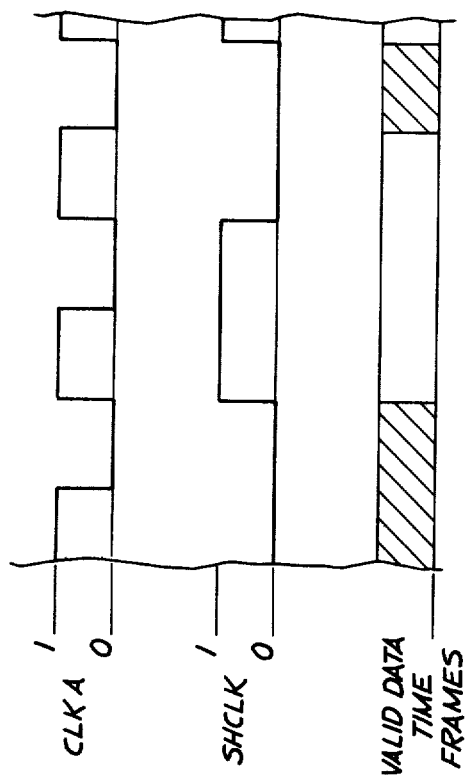
FIG. 7 shows the relationship between the system clock and the data shifting clock signals and valid data transfer frames.

FIG. 7 illustrates the relationship between a system clock signal CLK A and the data shifting clock signal SHCLK in a preferred embodiment of the invention. The frequency of the system clock signal CLK A is twice the frequency of the SHCLK signals. The SHCLK signals go high at the leading edge of one CLK A pulse and return low at the leading edge of the following CLK A pulse. While the SHCLK pulse is synchronous relative to the system clock, the system clock can be asynchronous.

The two clock pulses taken together define a valid data time frame during which data can be transferred from one processor to another in the multiprocessor system. The valid data time frame is defined as the entire period of time during which either the CLK A pulse or the SHCLK pulse is high. Data cannot be transmitted when both clock pulses are low. The valid data time frame is shown in FIG. 7 as a clear or unshaded block. The time frames within which data may not be transmitted are shown as cross hatched intervals.

Figure 8:
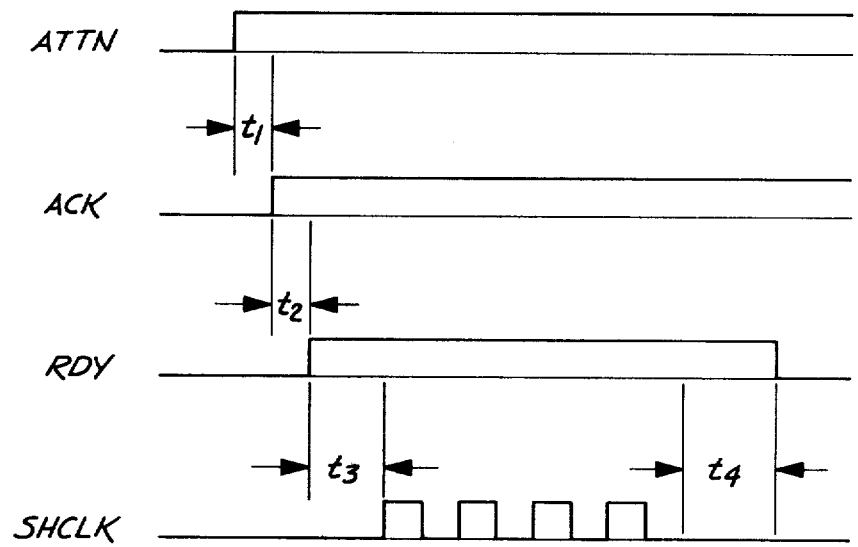
FIG. 8 is used in describing the relative timing of the different interprocessor signals.

FIG. 8 illustrates the time relationship between ATTN, ACK, RDY and SHCLK signals generated at the beginning of an interprocessor data transfer. The data transfer process is, of course, initiated when the ATTN signal to the particular subsystem processor goes high. The time lag $t_1$ between the rise of the ATTN signal and the rise of the ACK signal from the addressed subsystem processor is determined by the time required by the subsystem processor to service the ATTN signal. If the subsystem processor is occupied with subsystem operations at the time it is addressed, the time lag $t_1$ will naturally be longer than if the subsystem processor is idle. In terms of system clock or CLK A cycles, the ACK signal should rise somewhere between 4 and 350 CLK A cycles following the rise of tthe ATTN signal. For a preferred embodiment of the invention, the system clock frequency is on the order of 100 kilohertz. At that frequency, the time lag $t_1$ will range between approximately 40 microseconds and 3521 microseconds.

The time lag $t_2$ between the rise in the ACK signal and the rise in the RDY signal may be considerably shorter since that processor will already be conditioned by the ATTN signal. However, $t_2$ will be at least 4 CLK A cycles or 40 microseconds.

The time lapse between the rise in the RDY signal and the leading edge of the first SHCLK pulse or between the following edge of the RDY signal and the last complete SCHLK cycle ($t_3$ and $t_4$, respectively,) will preferably be on the order of 11 CLK A cycles or 111 microseconds.

Figure 9:
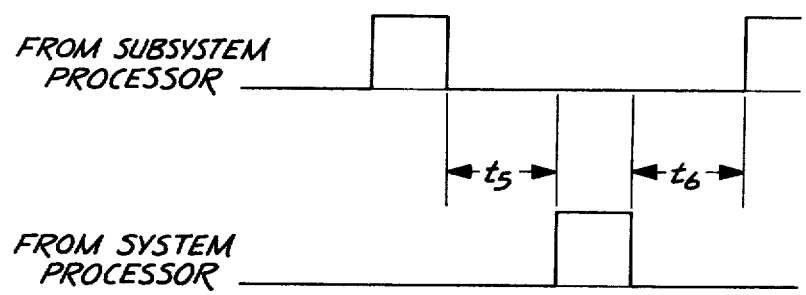
FIG. 9 is used to illustrate the relative times of occurrence of RDY signals during a transfer of data.

FIG. 9 illustrates the time relationship between successive RDY signal generated in a subsystem processor and the system processor. The time interval $t_5$ between the trailing edge of a RDY pulse generated by a subsystem processor and a leading edge of a RDY pulse generated by the system processor is preferably in a range of 14 to 40 CLK A cycles or 141 to 402 microseconds. A typical time interval between the trailing edge of the system processor RDY pulse would be 16 CLK A cycles or 161 microseconds. The actual number of CLK A cycles during the time interval $t_6$ is determined by the time required for the subsystem processor to check the complemented data received from the system processor and to fetch the next data word for transmission. Of course, if the complemented word does not correspond to the originally transmitted word, the subsystem RDY signal is not raised. Instead, the ACK signal is dropped.

Different message formats are used in transmitting data to the different processors in the multiprocessor system. The six word format used in transmitting data from the scale processor to the system processor has already been described. Preferred message formats for exchanging data with either of the other two subsystem processors in the system via the serial data bus are more complex.

In the course of a data transfer between the system processor and the postage printing subsystem processor, ten words are exchanged. When the subsystem processor first addresses the postage printing subsystem processor by raising the ATTN line, the subsystem processor responds by raising its ACK line and by transmitting a four bit status word to the system processor. A key code consisting of two four bit words is transmitted from the system processor to the subsystem processor to, among other things, select one of the two potentially available postage printers for use. The key code is followed by sixteen bits of data representing the postage value to which the printer is to be set. This data is divided into four bit words representing, in BCD format, the postage to be printed by each of the four banks of the postage printer. The postage data is followed by a SET signal embedded into a four bit word. Upon command by the system processor, the postage printing subsystem processor returns a four bit error word which indicated that either no error or an error of a certain type has occurred. The types of errors which can be reported to the system processor by means of the error word include jam conditions, setting difficulties, the nonexistence of a supposedly selected, postage printer, the transmission of four digits of postage data ($00.00) to a printer capable of printing only three digits ($0.00), the failure of the selected printer to release any print-inhibiting interlock and a lack of correspondence between the postage value selected and the postage value to which the selected printer was actually set.

Error codes transmitted to the system processor from the postage printing subsystem processor are displayed by means of a numeric code on the system display to inform a system user of the type of error noted.

The message format for transfers of data between the system processor and the peripherals subsystem processor is more complex than the above-discussed message formats. When the system processor addresses the peripherals subsystem processor by raising the signal on its ATTN line, the peripherals subsystem processor responds by raising its ACK signal and by clocking out two four bit status words to the system processor. The first of these status words may either identify a specific peripheral device, including the two parcel identification number counters, for which some error condition has been detected or may indicate that no error conditions exist. The second of the four bit status words would preferably define one of six possible conditions for the peripheral identified by the first status word. The conditions are failure to generate a correct check sum during the previous eight transmissions to the peripheral, improper peripheral setting or jam conditions, a peripheral not in place or not turned on, a peripheral which lacks necessary recording media (paper, magnetic tape, etc.), a peripheral which failed to print/record the last or next to the last transaction. The second status word may also indicate simply that the identified peripheral is operational.

Where more than one peripheral device has an error condition to be reported, the two status words will be repeated until the status of such peripheral devices has been transmitted to the system processor.

Nineteen data words, each four bits long, are transmitted over the serial data bus from the system processor to the peripheral subsystem processor. The first of two of these words are control words. The first control word includes data bits which serve different functions. Certain bits identify the postage printer being set by the postage printing subsystem processor, indicate that PRINT signal has been given, and indicate that the postage to which to which the printer is set should be used to updating data recorded in the peripherals subsystem. The second control word can be used to establish whether the system is to operate in a letter mode, is to be cleared and whether any breakdown conditions exist. Third and fourth data words identify any special fees included in the postage value to which a postage printer had been set. The fifth through the eighth words represent the four digits of postage ($00.00) to which the printer was set in the previous transaction. The next two words identify the class of mail by which a parcel is being mailed. The eleventh through the fourteenth words represent the weight of the parcel in pounds and ounces while the fifteenth word indicates whether a half ounce parcel weight has been recorded. The next two words identify the zone of the parcel destination. The last three data words of the message are BCD representations of the first three digits or prefix of the destination zip code, if available.

The system has been described thus far without reference to specific processors or specific programming language since different, commercially-available processors and different programming languages compatible with the particular processors might be used.

In a preferred embodiment, the systems processor may be a PPS-4/1 one chip microcomputer, MM76 series. The scale subsystem processor and the peripheral subsystem processor are preferably MM-78 Series microcomputers while the postage printer subsystem processor is preferably a MM-77 Series microcomputer. All of the foregoing microcomputer products are manufactured by Rockwell International Corporation of Anaheim, California.

Instruction Sets for programming these devices are disclosed in Product Description, MM-76 Series, March 1977, Revision:3, 29410N41 and Product Description, MM77 and MM-78, March 1977, Revision:3, 29410N42, both available from Rockwell International Corp.

The program listings for transferring data between the systems processor and the various subsystem processors are reproduced in the Appendix to this specification. Reference should be made to the Product Descriptions listed above for explanations of the listing entries.

While there has been described what is considered to be a preferred embodiment of the invention, variations and modifications therein will occur to those skilled in the art when they become acquainted with the basic concepts of the invention. Therefore, it is intended that the appended claims shall be construed to include all such variations and modifications as fall within the true spirit and scope of the invention.

SYSTEM PROCESSOR PROGRAM

APPENDIX

```
BADR PADR TXT APG  STMT     SOURCE  STATEMENT

1              NAME    MM76
                     2              PUNCH TAPE   LACY   (4/1)   PITNEY-BOWES SCALE PROCESSOR

5      ******* SPDDFY ADDRESSES FOR INPUT/OUTPUT

7      $RDY    EQU    #30      !READY
                     8      $H1     EQU    #31      !HANDSHAKE LINE FOR 4/2 COMMUNICATIONS
                     9      $H2     EQU    #32      !HANDSHAKE LINE FOR 4/2 COMMUNICATIONS
                    10      $H3     EQU    #33      !HANDSHAKE LINE FOR 4/2 COMMUNICATIONS
                    11      $H4     EQU    #34      !HANDSHAKE LINE FOR 4/2 COMMUNICATIONS
                    12      $ATR    EQU    #37      !ATTENTION BERKEL
                    13      $ATP    EQU    #38      !ATTENTION PERIPHERAL CONTROLLER
                    14      $ATM    EQU    #39      !ATTENTION METER SETTING DEVICE CONTROLLER
                    15      $PULS   EQU    #37      !(CHECKOUT) CAPTURE TTL COUNTER
                    16      $USEL   EQU    #38      !(CHECKOUT) SELECT UPPER 8 BITS OF COUNTER
                    17      $CLEAR  EQU    #39      !(CHECKOUT) CLEAR COUNTER
                    18      $RDYS   EQU    #1       !
                    19      $H1S    EQU    #1       !
                    20      $H2S    EQU    #1       !
                    21      $H3S    EQU    #1       !
                    22      $H4S    EQU    #1       !
                    23      $ZROS   EQU    #1       !
                    24      $ATRS   EQU    #1       !
                    25      $ATPS   EQU    #1       !
                    26      $ATMS   EQU    #1       !
                    27      $PULSS  EQU    #1       !
                    28      $USELS  EQU    #1       !
                    29      $CLFRS  EQU    #1       !
                    30      $AT?S   EQU    #1       !UNKNOWN ATTENTION LINE
                    31      $       EQU    #1       !ANY I/O LINE

33      ******* EXCLUSIVE-OR OPERANDS

35      $IBUFF  EQU    #2       !
                    36      BUFF:$  EQU    #2       !
                    37      IW:PIW  EQU    #1       !
                    38      PIW:IW  EQU    #1       !
                    39      AB:OAB  EQU    #1       !
                    40      N:OAB   EQU    #1       !
                    41      IW:KER  EQU    #2       !
                    42      KER:IW  EQU    #2       !
                    43      0:1     EQU    #1       !
                    44      1:2     EQU    #3       !
                    45      2:3     EQU    #1       !
                    46      3:0     EQU    #3       !

48      ******* B-LOWER VALUES       !

50      KER4BL  EQU    #0
                    51      $ZROBL  EQU    #5       !
                    52      ABL     EQU    #5       !
                    53      BBL     EQU    #6       !
                    54      BCTR1B  EQU    #6       !
                    55      $ATPBL  EQU    #8       !
                    56      $ATMBL  EQU    #9       !
                    57      $CLRBL  EQU    #9       !

59      ******* RAM LOCATIONS        !

61      IW3     EQU    #01      !
                    62      IW2     EQU    #02      !
                    63      IW1     EQU    #03      !
                    64      IW0     EQU    #04      !
```

| BADR | PADR | TXT | ARG | STMT | SOURCE | STATEMENT | | | |
|---|---|---|---|---|---|---|---|---|---|
| | | | | 65 | A | EQU | #05 | !VALUE OF A SIGNAL IN BIT 4 | |
| | | | | 66 | B | EQU | #06 | !VALUE OF B SIGNAL IN BIT 3 | |
| | | | | 67 | FLAGS | EQU | #07 | ! | |
| | | | | 68 | CHFLG | EQU | #1 | !"CHANGE" FLAG | |
| | | | | 69 | BERFLG | EQU | #2 | !BERKEL | |
| | | | | 70 | SUBFLG | EQU | #3 | !SUBTRACT 1 FROM WEIGHT | |
| | | | | 71 | PASCTR | EQU | #08 | | |
| | | | | 72 | BUX | EQU | #08 | !STORED B-UPPER | |
| | | | | 73 | BLX | EQU | #09 | !STORED B-LOWER | |
| | | | | 74 | CNT1 | EQU | #0A | !MSD--COUNTER FOR COMMUNICATIONS | |
| | | | | 75 | CNT0 | EQU | #0B | !LSD--COUNTER FOR COMMUNICATIONS | |
| | | | | 76 | 16CTR | EQU | #0B | !COUNTER FOR WEIGHT SAMPLES | |
| | | | | 77 | SCRACH | EQU | #0C | ! | |
| | | | | 78 | BUFF | EQU | #10 | !START OF DATA BUFFER FOR COMMUNICATIONS | |
| | | | | 79 | PIW3 | EQU | #11 | ! | |
| | | | | 80 | PIW0 | EQU | #14 | ! | |
| | | | | 81 | OA | EQU | #15 | ! | |
| | | | | 82 | OB | EQU | #16 | ! | |
| | | | | 83 | KER4 | EQU | #20 | ! | |
| | | | | 84 | KER0 | EQU | #24 | ! | |
| | | | | 85 | ALSAMF | EQU | #25 | ! | |
| | | | | 86 | BCTR1 | EQU | #26 | ! | |
| | | | | 87 | BCTR0 | EQU | #27 | ! | |
| | | | | 88 | ACTR1 | EQU | #28 | ! | |
| | | | | 89 | ACTR0 | EQU | #29 | ! | |
| | | | | 90 | | ORG | #000 | | |
| | | | | 91 | ******* | PUT ALL I/O'S LOW | | ! | |
| 0000 | 0000 | 20 | 0 | 92 | ZIO | LBI | #30 | ! | |
| 0001 | 0020 | 1F | 3 | 92 | | | | | |
| 0002 | 0010 | BF | 03C0 | 93 | | TM | LO>$ | | |
| 0003 | 0008 | 26 | 6 | 94 | | LBI | #36 | !NOW PUT DIO6 HIGH | |
| 0004 | 0004 | 1F | 3 | 94 | | | | | |
| 0005 | 0002 | 00 | | 95 | | NOP | | ! | |
| 0006 | 0021 | 10 | 1 | 96 | | SR | $ | | |
| | | | | 97 | ******* | WAIT FOR SACK LOW | | | |
| 0007 | 0030 | 04 | | 98 | | INTOL | | ! | |
| 0008 | 0018 | CF | 0007 | 99 | | T | *-1 | !SACK HIGH | |
| 0009 | 000C | 7F | 15 | 100 | | LAI | 15 | | |
| 000A | 0006 | 18 | | 101 | | OA | | | |
| | | | | 102 | A100 | EQU | * | | |
| 000B | 0021 | 3E | 1 | 103 | TOCOMM | TI | COMM | | |
| 000C | 0011 | FF | 0040 | 103 | | | | | |
| 000D | 0028 | 00 | | 0 | | | | | |
| 000E | 0014 | 00 | | 0 | | | | | |
| 000F | 0004 | 00 | | 0 | | | | | |
| 0010 | 0025 | 00 | | 0 | | | | | |
| 0011 | 0032 | 00 | | 0 | | | | | |
| 0012 | 0039 | 00 | | 0 | | | | | |
| 0013 | 003C | 00 | | 0 | | | | | |
| 0014 | 001E | 00 | | 0 | | | | | |
| 0015 | 002F | 00 | | 0 | | | | | |
| 0016 | 0017 | 00 | | 0 | | | | | |
| 0017 | 0008 | 00 | | 0 | | | | | |
| 0018 | 0005 | 00 | | 0 | | | | | |
| 0019 | 0022 | 00 | | 0 | | | | | |
| 001A | 0031 | 00 | | 0 | | | | | |
| 001B | 0038 | 00 | | 0 | | | | | |
| 001C | 001C | 00 | | 0 | | | | | |
| 001D | 000E | 00 | | 0 | | | | | |
| 001E | 0027 | 00 | | 0 | | | | | |
| 001F | 0013 | 00 | | 0 | | | | | |
| 0020 | 0009 | 00 | | 0 | | | | | |
| 0021 | 0024 | 00 | | 0 | | | | | |
| 0022 | 0012 | 00 | | 0 | | | | | |
| 0023 | 0029 | 00 | | 0 | | | | | |
| 0024 | 0034 | 00 | | 0 | | | | | |
| 0025 | 0016 | 00 | | 0 | | | | | |
| 0026 | 0020 | 00 | | 0 | | | | | |
| 0027 | 0036 | 00 | | 0 | | | | | |
| 0028 | 0038 | 00 | | 0 | | | | | |
| 0029 | 001D | 00 | | 0 | | | | | |
| 002A | 002E | 00 | | 0 | | | | | |
| 002B | 0037 | 00 | | 0 | | | | | |
| 002C | 001B | 00 | | 0 | | | | | |
| 002D | 000D | 00 | | 0 | | | | | |
| 002E | 002E | 00 | | 0 | | | | | |
| 002F | 0033 | 00 | | 0 | | | | | |
| 0030 | 0019 | 00 | | 0 | | | | | |
| 0031 | 002C | 00 | | 0 | | | | | |
| 0032 | 0014 | 00 | | 0 | | | | | |
| 0033 | 002B | 00 | | 0 | | | | | |
| 0034 | 0015 | 00 | | 0 | | | | | |
| 0035 | 002A | 00 | | 0 | | | | | |
| 0036 | 0035 | 00 | | 0 | | | | | |
| 0037 | 003A | 00 | | 0 | | | | | |
| 0038 | 0030 | 00 | | 0 | | | | | |
| 0039 | 003E | 00 | | 0 | | | | | |
| 003A | 003F | 00 | | 0 | | | | | |
| 003B | 001F | 00 | | 0 | | | | | |

```
BADR PADR TXT ARG STMT     SOURCE  STATEMENT 003C 000F  00         0
003D 0007  00         0
003E 0003  00         0
003F 0001  00         0
                     104         ORG    #040        !
                     105  COMM   EQU    *
0040 0040  7F  15    106         LAT    15          !
0041 0060  1B        107         DA                 !FIX UP THESE LINES FOR OTHER USES
0042 0050  AC 03DF   108         TM     $LBH4       !
0043 0048  0B   1    109         SKBF   $H4S        !$H4 HIGH?
0044 0044  DE 0046   110         T      R42         !YES
0045 0042  FF 0040   111         T      COMM        !NO
                     112  ******* R42--RECEIVE FROM 4/2 ("ROUTINE A" IN NOTES)
                     113  ******* COULD BE ATTN ID OF BERKEL, MSDC, OR PC; COULD BE REQUEST FOR
                     114  ******* KERNEL; COULD BE DATA CHARACTERS FOR MSDC OR PC.
0046 0061  A1 03F9   115  R42    TM     ABF>BX      !ADDRESS OF BUFF TO B_X
0047 0070  2B  11    116         LB     CNT0        !
0048 0058  90 03D5   117         TM     ZERO2       !CLEAR CTR
0049 004C  AC 03DF   118  R4220  TM     $LBH4       !
004A 0046  0B   1    119         SKBF   $H4S        !$H4 HIGH?
004B 0063  CE 005A   120         T      R42B0       !YES
004C 0051  9B 03DF   121  R4225  TM     $LBH3       !
004D 0068  14   1    122         RB     $H3S        !PUT $H3 LOW
004E 0054  87 03DB   123         TM     $LBATB      !NO, FINISHED OR NO MESSAGE
004F 004A  0B   1    124  R4230  SKBF   $AT?S       !
0050 0065  EA 005B   125         T      TOSTH       !THIS $ATTN HIGH! GO SEND TO THING
0051 0072  54   0    126         XNSK               !
0052 0079  35  10    127         SKBEI  #A          !
0053 007C  2A  10    127
0054 005E  F5 004F   128         T      R4230       !THIS $ATTN LINE LOW! WE'LL LOOK AT NEXT
0055 006F  A4 03FC   129         TM     AT>BL       !NO $ATTN HI! WE JUST GOT $ATTN ID
                     130  *                         !AT>BL EXITS DIRECTLY TO "SEND" IF 4/2
                     131  *                         !HAS REQUESTED A KERNEL.
0056 0057  30   2    132         TL     RTH         !GO REC STAT/DATA (BERKEL) OR STAT (MSD/PC)
0057 004B  FF 0080   132
005A 0045  3C   3    133  TOSTH  TL     STH         !GO SEND DATA TO THING (MSD OR PC)
0059 0062  E6 00F0   133
005A 0071  A3 03DC   134  R4280  TM     $LBH1       !PUT $H1 LOW
005B 007A  14   1    135         RB     $H1S        !
005C 005C  9B 03DF   136         TM     $LBH3       !PUT $H3 HIGH
005D 004E  10   1    137         SB     $H3S        !
005E 0067  B1 03DD   138  R4285  TM     $LBH2       !WAIT FOR $H2 HIGH
005F 0053  0B   1    139         SKBF   $H2S        !
0060 0049  F5 0065   140         T      R4290       !HIGH, OK
0061 0064  AC 03DF   141         TM     $LBH4       !LOW
0062 0052  0B   1    142         SKBF   $H4S        !$H4 HIGH?
0063 0069  DB 005E   143         T      R4285       !YES, KEEP WAITING FOR $H2 HIGH
0064 0074  EE 004C   144         T      R4225       !$H4 LOW, FINISHED
0065 005A  7F  15    145  R4290  LAT    15          !
0066 006D  1A        146         IAM                !READ 4 BITS TO AC
0067 0076  4E        147         XAS                !TEMP SAVE AC IN S
0068 0078  7F 03C2   148         TM     B X>H       !STORED B-VALUE TO B
0069 005D  4F        149         XAS                !RESTORE SAVED AC
006A 006E  58   0    150         X                  !STORE THE DATA BITS
006B 0077  A3 03DC   151         TM     $LBH1       !PUT $H1 HIGH
006C 005B  10   1    152         SB     $H1S        !
006D 004D  B1 03DD   153         TM     $LBH2       !WAIT FOR $H2 LOW
006E 0066  0B   1    154         SKBF   $H2S        !
006F 0073  D9 006F   155         T      *-1         !HIGH, KEEP WAITING
0070 0059  A3 03DC   156         TM     $LBH1       !LOW, OK
0071 006C  14   1    157         RB     $H1S        !PUT $H1 LOW
0072 0056  AF 03CC   158         TM     BUMPB       !BUMP B_X
0073 005B  2B  11    159         LB     CNT0        !DEBUMP CNT
0074 0055  7F  15    160         LAT    15          !
0075 006A  00        161         RC                 !
0076 0075  B6 03D2   162         TM     ACXDSK      !
0077 007A  7F  15    163         LAT    15          !
0078 007D  B6 03D2   164         TM     ACXDSK      !
0079 007E  F3 0049   165         T      R4220       !
007A 007F  00        0
007B 005F  00        0
007C 004F  00        0
007D 0047  00        0
007E 0043  00        0
007F 0041  00        0
                     166         ORG    #080        !
                     167  ******* RTH--RECEIVE STATUS AND DATA (IF BERKEL) OR STATUS ONLY ( IF
                     168  *******         MSD OR PC); ENTER WITH AC HOLDING B-LOWER VALUE FOR 1ST CH--
                     169  *******         THIS IS "ROUTINE C" IN NOTES.
0080 0080  B7 03C3   170  RTH    TM     42INT?      !
0081 00A0  04        171         INTOL              !ACK HIGH?
0082 0090  FF 0080   172         T      RTH         !YES, BAD
0083 00B8  17        173         DINO               !COCK INTERRUPT FLIP-FLOP
0084 00B4  00        174         NOP                !
0085 0082  20   0    175         LBL    BUFF        !
0086 0061  10   1    175
0087 00B0  4C        176         LSA                !COPY B-LOWER VALUE INTO S FROM AC
0088 0008  50   0    177         L                  !ATTN ID TO AC
```

| BADR | PADR | TXT | ARG | STMT | SOURCE | STATEMENT | | |
|---|---|---|---|---|---|---|---|---|
| 0089 | 0CAC | 4E | | 178 | | XAS | | !ATTN ID TO S; B-LOWER TO AC |
| 008A | 0026 | 44 | | 179 | | LRA | | !B-LOWER TO B-LOWER |
| 008B | 0CA3 | 4E | | 180 | | XAS | | !ATTN ID TO AC |
| 008C | 0091 | 4C | | 181 | | LSA | | !ATTN ID TO S (AC ALSO HAS A COPY) |
| 008D | 0CAB | 54 | 0 | 182 | | XNSK | | !STORE ATTN ID; GARB TO AC |
| 008E | 0C94 | 4E | | 183 | | XAS | | !GARB TO S; ATTN ID TO AC |
| 008F | 00BA | 46 | | 184 | | XAR | | !NEW B-LOWER TO AC; ATTN ID TO B-LOWER |
| 0090 | 0085 | 1F | 2 | 185 | | EOR | BUFF!S | !(LRL PROPER ATTN LINE) |
| 0091 | 0082 | 00 | | 186 | | NOP | | ! |
| 0092 | 0089 | 10 | 1 | 187 | | SB | SATT5 | !PUT PROPER ATTN LINE HIGH |
| 0093 | 00BC | 87 | 03C3 | 188 | | TM | 42INT? | !IS 4/2 INTERRUPTING US? |
| 0094 | 009E | 07 | | 189 | | DINO | | !NO, ACK HIGH? |
| 0095 | 00AF | C3 | 0093 | 190 | | T | *-2 | !NO, MAYBE IN A LITTLE WHILE |
| 0096 | 0097 | 05 | | 191 | RTH20 | INT1H | | !IS SRDY HIGH? |
| 0097 | 03BB | DD | 0099 | 192 | | T | RTH30 | !NO, SEE IF 4/2 IS INTERRUPTING |
| 0098 | 0085 | F6 | 00A0 | 193 | | T | RTH40 | !YES, GO WAIT FOR SRDY LOW |
| 0099 | 01A2 | 2? | ? | 194 | RTH30 | LRL | SH2 | |
| 009A | 01B1 | 1F | 3 | 194 | | | | |
| 009B | 00B8 | 00 | | 195 | | NOP | | |
| 009C | 009C | 0A | 1 | 196 | | SKBF | SH2S | !IS 4/2 INTERRUPTING? |
| 009D | 01BE | C0 | 00BA | 197 | | T | RTH1P | !YES |
| 009E | 01A7 | 05 | | 198 | | INT1H | | !NO, IS SRDY HIGH YET? |
| 009F | 0093 | F9 | 00B2 | 199 | | T | RTH90 | !NO, SEE IF THING WANTS TO QUIT EARLY |
| 00A0 | 0389 | 87 | 03C3 | 200 | RTH40 | TM | 42INT? | !IS 4/2 INTERRUPTING |
| 00A1 | 00A4 | 05 | | 201 | | INT1H | | !NO, IS SRDY LOW YET? |
| 00A2 | 0192 | CB | 00A4 | 202 | | T | *+2 | !YES, CONTINUE |
| 00A3 | 03A9 | F6 | 00A0 | 203 | | T | *-3 | !NO, NOT YET |
| 00A4 | 00B4 | 1F | 2 | 204 | | EOR | S!BUFF | !SET UP B-UPPER |
| 00A5 | 00BA | 46 | | 205 | | XAR | | !SET UP B-LOWER |
| 00A6 | 00AD | 4F | | 206 | | XAS | | !DATA TO AC |
| 00A7 | 00B0 | 4C | | 207 | | LSA | | !SAVE DATA IN S |
| 00A8 | 00BB | 54 | 0 | 208 | | XNSK | | !STORE DATA, BUMP B |
| 00A9 | 009D | E4 | 00AC | 209 | | T | RTH80 | !NOT DONE |
| 00AA | 00AE | 3C | 3 | 210 | TOS42 | TL | S42 | !GO SEND STATUS/DATA OR STATUS TO 4/2 |
| 00AB | 00B7 | FF | 00C0 | 210 | | | | |
| 00AC | 0098 | 4F | | 211 | RTH80 | XAS | | !DATA TO AC |
| 00AD | 00BD | 45 | | 212 | | COM | | !COMPLEMENT IT TO SEND BACK FOR VERIF |
| 00AE | 00A6 | 4E | | 213 | | XAS | | !INVERTED DATA TO S |
| 00AF | 00B3 | 46 | | 214 | | XAR | | !SAVE B-LOWER VALUE IN AC |
| 00B0 | 0099 | 96 | 03E3 | 215 | | TM | SENDC | !SEND INVERTED CHARACTER BACK |
| 00B1 | 00AC | EA | 0096 | 216 | | T | RTH20 | !GO DO NEXT |
| 00B2 | 0096 | 0. | | 218 | RTH90 | INT0L | | !IF SACK IS LOW, THE OTHER GUY QUIT EARLY |
| 00B3 | 00AB | EA | 0096 | 219 | | T | RTH20 | !SACK STILL HIGH |
| 00B4 | 0095 | 2F | 14 | 220 | | LRL | BUFF+14 | !OTHER GUY QUIT EARLY |
| 00B5 | 00AA | 1D | 1 | 220 | | | | |
| 00B6 | 00B5 | 70 | 0 | 221 | | LAI | 0 | !WE'LL SEND 4/2 ALL 0'S |
| 00B7 | 00BA | 5C | 0 | 222 | | XDSK | | !(ALWAYS A COMMUN ERROR) |
| 00B8 | 00BD | CA | 00B6 | 223 | | T | *-2 | ! |
| 00B9 | 00BF | D1 | 00AA | 224 | | T | TOS42 | ! |
| 00BA | 00BF | 3F | 0 | 225 | RTH1P | TL | 210 | !GO RESET I/O'S AND START OVER |
| 00BB | 00BF | FF | 0000 | 225 | | | | |
| 00BC | 00BF | 00 | | 0 | | | | |
| 00BD | 00E7 | 00 | | 0 | | | | |
| 00BE | 0083 | 00 | | 0 | | | | |
| 00BF | 0081 | 00 | | 0 | | | | |
| | | | | 226 | | ORG | #0C0 | |
| | | | | 227 | ******* | S42--SEND STATUS/DATA (IF BERKEL) OR STATUS (IF MSD OR OC) | | |
| | | | | 228 | ******* | TO 4/2. ("ROUTINE H" IN NOTES) | | |
| 00C0 | 00C0 | A4 | 03EC | 229 | S42 | TM | AT>BL | !DESIRED B-LOWER TO AC |
| | | | | 230 | S42X | EQU | * | !ENTER HERE FOR POST-MORTEM MESSAGE |
| 00C1 | 00F0 | 87 | 03DB | 231 | | TM | SLBATR | !YES |
| 00C2 | 00D0 | 14 | 1 | 232 | | RB | SATRS | !PUT BERKEL ATTENTION LINE LOW (IF WAS HI) |
| 00C3 | 00C8 | 43 | 03DC | 233 | S4240 | TM | SLBH1 | ! |
| 00C4 | 00C4 | 10 | 1 | 234 | | SB | SH1S | !PUT SH1 HIGH |
| 00C5 | 00C2 | AC | 03DF | 235 | | TM | SLBH4 | !WAIT FOR SH4 LOW |
| 00C6 | 00F1 | 0A | 1 | 236 | | SKBF | SH4S | |
| 00C7 | 03F0 | 0F | 00C6 | 237 | | T | *-1 | |
| 00C8 | 00D8 | 81 | 03DD | 238 | | TM | SLBH2 | !WAIT FOR SH2 HIGH |
| 00C9 | 00CC | 0A | | 239 | | SKBF | SH2S | ! |
| 00CA | 00C6 | FF | 00CC | 240 | | T | *+2 | !SH2 IS HIGH |
| 00CB | 00E3 | F3 | 00C9 | 241 | | T | *-2 | !SH2 IS STILL LOW, KEEP WAITING |
| 00CC | 00D1 | 44 | | 242 | S4260 | LRA | | !B-LOWER TO B-LOWER |
| 00CD | 00EF | 1F | 2 | 243 | | EOR | S!BUFF | !ADDRESS REGISTER WITH BUFFER |
| 00CE | 00D4 | 4C | | 244 | | LSA | | !B-LOWER TO S |
| 00CF | 00CA | 50 | 0 | 245 | | L | | !AC HOLDS CHARACTER TO BE SENT |
| 00D0 | 00F5 | 18 | | 246 | | OA | | !OUTPUT 4 BITS OF DATA |
| 00D1 | 00E2 | 23 | 3 | 247 | | LRL | SH3 | !PUT SH3 HIGH |
| 00D2 | 00F9 | 1F | 3 | 247 | | | | |
| 00D3 | 00FC | 00 | | 248 | | NOP | | |
| 00D4 | 00DE | 10 | 1 | 249 | | SB | SH3S | ! |
| 00D5 | 00FF | AC | 03DF | 250 | | TM | SLBH4 | !WAIT FOR SH4 HIGH |
| 00D6 | 00D7 | 0A | 1 | 251 | | SKBF | SH4S | ! |
| 00D7 | 00CB | DD | 00D9 | 252 | | T | *+2 | ! |
| 00D8 | 00C5 | E8 | 0006 | 253 | | T | *-2 | ! |
| 00D9 | 00F2 | 7F | 15 | 254 | | LAI | 15 | ! |
| 00DA | 00F1 | 18 | | 255 | | OA | | !FLOAT THE LINES |
| 00DB | 00F8 | 98 | 03DE | 256 | | TM | SLBH3 | !PUT SH3 LOW |

```
BADR PADR TXT ARG  STMT      SOURCE  STATEMENT 000C 000C  14   1   257              RR      SH3S          !
00CD 00CE  AC 03DF  258              TM      SLBH4         !WAIT FOR SH4 LOW
000E 00E7  08   1   259              SKBF    SH4S          !
000F 00D3  DA 000E  260              T       *-1           !
00E0 00C9  4E       261              XAS                   !B=LOWER FROM S
00E1 00F4  61   1   262              AISK    1             !DONE?
00E2 00D2  CB 00F4  263              T       *+2           !YES
00E3 00E9  EE 00CC  264              T       S4260         !NO
00F4 00F4  A3 03DC  265              TM      SLBH1         !PUT SH1 LOW
00F5 00DA  14   1   266              RR      SH1S
00F6 00F0  B1 03DD  267              TM      SLBH2
00F7 00F6  08   1   268              SKBF    SH2S          !
00F8 00F8  C9 00F7  269              T       *-1           !WAIT FOR SH2 LOW
00F9 00D0  27   7   270              LB      FLAGS
00FA 00FE  00       271              NOP
00FB 00F7  09   2   272              SKBF    BERFLG
00FC 00DB  3F   0   273              TL      Z10
00ED 00CD  FE 0000  273
00EF 00F6  3E   1   274              TL      COMM
00FF 00F3  FF 0040  274
                    275      ******* STH--SEND TO THING (MSD OR PC). THIS IS "ROUTINE D" IN NOTES.
00F0 00D9  B7 03C3  276      STH     TM      42INT?        !
00F1 00FC  07       277                      DINO          !COCK INTERRUPT FLIP-FLOPS
00F2 00D6  00       278                      NOP           !
00F3 00FB  06       279                      DIN1          !
00F4 00D5  00       280                      NOP           !
00F5 00EA  3B   4   281              TL      STH10
00F6 00F5  FF 0100  281
00F7 00FA  00       0
00F8 00FD  00       0
00F9 00FE  00       0
00FA 00FF  00       0
00FB 00DE  00       0
00FC 00CF  00       0
00FD 00C7  00       0
00EE 00C3  00       0
00FF 00C1  00       0
                    282              ORG     #100
0100 0100  B1 03F9  283      STH10   TM      ABF>BX        !ADDRESS OF BUFF TO B_X
0101 0120  70   0   284              LAT     0             !WE'LL SEE IF MESSAGE LENGTH IS TO BE 0
0102 0110  2A  10   285              LB      CNT1
0103 0108  47       286              SKMEA
0104 010A  F9 010A  287              T       STH20         !NO
0105 0102  2B  11   288              LB      CNT0          !MAYBE
0106 0121  47       289              SKMEA
0107 0130  F9 010A  290              T       STH20         !NO
0108 0118  3F   0   291              TL      Z10           !YES, DON'T SEND ANY CHARACTERS
0109 010C  FF 0000  291
010A 0106  AF 03C2  292      STH20   TM      B_X>B         !SET UP B-REGISTER
010B 0123  50   0   293              L                     !
010C 0111  4E       294              XAS                   !
010D 0128  96 03F3  295              TM      SENDC         !SEND A CHARACTER TO MSD OR PC
010E 0114  05       296      STH30   INT1H                 !IS SRDY HIGH?
010F 010A  CD 0111  297              T       STH33         !NO, NOT YET
0110 0125  FA 011A  298              T       STH37         !YES
0111 0132  22   2   299      STH33   LBL     SH2
0112 0139  1F   3   299
0113 013C  00       300              NOP
0114 011E  08   1   301              SKBF    SH2S          !IS 4/2 INTERRUPTING
0115 012F  CA 0136  302              T       STH1P         !YES
0116 0117  05       303              INT1H                 !IS SRDY HIGH YET?
0117 0109  EA 0134  304              T       STH90         !NO, NOT YET
0118 0105  B7 03C3  305      STH37   TM      42INT?        !SRDY IS HIGH; IS 4/2 INTERRUPTING?
0119 0122  05       306              INT1H                 !NO, IS SRDY LOW?
011A 0121  E3 011C  307              T       *+2           !YES, CONTINUE
011B 013B  FA 011B  308              T       *-3           !NO, NOT YET 011C 011C  AF 03C2  310      STH40   TM      B_X>B         !SET UP B-REGISTER
011D 010E  4F       311              XAS                   !RECEIVED CHAR TO AC
011E 0127  45       312              COM                   !COMPLEMENT IT FOR VERIFICATION
011F 0113  47       313              SKMEA                 !DID WE GET BACK THE COMPL OF WHAT WE SENT?
0120 0109  C2 0138  314              T       STHBAD        !
0121 0124  AF 03CC  315              TM      BUMPB         !YES, BUMP STORED B
0122 0112  9C 03CB  316              TM      BUMPC         !BUMP COUNTER
0123 0129  01       317              SKNC                  !COUNTER OVERFLOW?
0124 0134  D2 0126  318              T       *+2           !YES, DONE
0125 011A  F9 010A  319              T       STH20         !NO, GO SEND NEXT CHARACTER
0126 0120  96 03F3  320              TM      SENDC         !PULSE RDY
0127 0136  B7 03C3  321              TM      42INT?        !IS 4/2 INTERRUPTING US?
0128 013B  04       322              INTOL                 !NO, IS SENDEE'S ACK LOW?
0129 0110  C9 0127  323              T       STH60         !NOT YET, MAYBE SOON
012A 012E  9F 03C1  324      STH70   TM      LO>SA         !LOWS TO ALL ATTENTION LINES
012B 0137  7F  15   325              LAT     15            !POST-MORTEM MESSAGE INDICATING "GOOD"
012C 011B  70   0   326      STH80   LAT     0             !POST-MORTEM MESSAGE INDICATING "BAD"
012D 0100  2F  15   327              LBI     #1F
012E 0126  1D   1   327
012F 0133  00       328              NOP
0130 0119  5B   0   329              X                     !PUT POST-MORTEM MESSAGE IN BUFFER
```

```
HADR PADR TXT APG  STMT    SOURCE  STATEMENT 0131 012C  7F  15   330            LAT     15
0132 0116  3C   3   331            TL      S42X        ;GO SEND POST-MORTEM MESSAGE
0133 012B  0F 00C1  331
0134 0115  04       332    STH90   INTOL               ;THING QUIT EARLY IF $ACK LOW
0135 012A  EB 010E  333            T       STH30       ;$ACK NOT LOW; KEEP WAITING FOR $RDY LOW
0136 0135  3F   0   334    STHIP   TL      ZIO         ;GO RESET I/O'S AND START OVER
0137 013A  FF 0000  334

0138 0130  9F 03C1  336    STHBAD  TM      LO>$A
0139 013E  B7 03C3  337            TM      42INI?
013A 013F  04       338            INTOL
013B 011F  C1 0139  339            T       *-2
013C 010F  E4 012C  340            T       STH80
013D 0107  00        0
013E 0103  00        0
013F 0101  00        0

341            ORG     #1C0        ;*** POWER-ON PAGE ***
                    342    ******* CLEAR I/O'S AND RAM !
01C0 01C0  20   0   343    PWR     LB      #00
01C1 01E0  70   0   344    PWR2    LAT     0           !
01C2 01D0  59   1   345            X       0:1         !
01C3 01C8  70   0   346            LAT     0           !
01C4 01C4  5B   3   347            X       1:2         !
01C5 01C2  70   0   348            LAT     0           !
01C6 01F1  59   1   349            X       2:3         !
01C7 01E0  00       350            NOP                 !
01C8 01DA  14   1   351            RB      $           !
01C9 01CC  57   3   352            XNSK    310         !
01CA 01C6  DF 01C1  353            T       PWR2        !
                    354    ******* WAIT FOR $H1-$H4 LOW!
01CB 01F3  AC 03DF  355    WAITH   TM      $LBH4       !
01CC 01D1  0B   1   356    WAITH2  SKBF    $           !
01CD 01EB  FE 01CC  357            T       *-1         !
01CE 01D4  5C   0   358            XDSK
01CF 01CA  3F   0   359            SKBEI   0
01D0 01F5  20   0   359
01D1 01F2  EF 01CC  360            T       WAITH2      !
01D2 01F9  3F   0   361            TL      ZIO
01D3 01FC  FF 0000  361
                    362    *******
01D4 01DE  14   1   363    RB      RB      $           !
01D5 01FF  02       364            RT
01D6 01D7  00       0
01D7 01CB  00       0
01D8 01C5  00       0
01D9 01F2  00       0
01DA 01F1  00       0
01DB 01FA  00       0
01DC 01DC  00       0
01DD 01CE  00       0
01DE 01F7  00       0
01DF 01D3  00       0
01E0 01C9  00       0
01E1 01F4  00       0
01E2 01D2  00       0
01E3 01F9  00       0
01E4 01F4  00       0
01E5 01DA  00       0
01E6 01FD  00       0
01E7 01F6  00       0
01E8 01F5  00       0
01E9 01DD  00       0
01EA 01FF  00       0
01EB 01F7  00       0
01EC 01D8  00       0
01ED 01CD  00       0
01EE 01F6  00       0
01EF 01F3  00       0
01F0 01D9  00       0
01F1 01EC  00       0
01F2 01D6  00       0
01F3 01EB  00       0
01F4 01D5  00       0
01F5 01FA  00       0
01F6 01F5  00       0
01F7 01FA  00       0
01F8 01FD  00       0
01F9 01EE  00       0
01FA 01FF  00       0
01FB 01DF  00       0
01FC 01CF  00       0
01FD 01C7  00       0
01FE 01C3  00       0
01FF 01C1  00       0

365            ORG     #380        ;*** SECONDARY SUBROUTINE PAGE ***
                    366    ******* ENTER HERE TO PUT LOWS ON ALL ATTENTION LINES
0380 0380  27   7   367    LO>A1   LBL     $ATB        !
0381 03A0  1F   3   367
```

```
HADR PADR TXT ARG  STMT       SOURCE  STATEMENT 0382 0390  00       368               NOP                    !
                    369       ******* ENTER HERE TO PUT LOWS ON ADDRESSED LINE AND THOSE TO RIGHT
0383 0388  14   1   370       LO>$1   BR      $              !
0384 0394  54   0   371               XNSK                   !
0385 0382  F7 0383  372               T       *-2            !
0386 03A1  02       373               RT                     !
                    374       ******* H_X>B--LOAD BU,BL FROM BUX,BLX (S IS PRESERVED, A IS DESTROYED)
0387 0380  29   9   375       B_XB1   LB      BLX            !
0388 033A  50   0   376               L                      !DESIRED B-LOWER TO AC
0389 033C  5C   0   377               XDSK                   !DUE TO FUNNY 4/1 TIMING.
038A 0316  58   0   378               X                      ! THESE 2 INSTRS JUST CHANGE BL.
038B 0313  08   1   379               SKBF    1              !B-UPPER 1 OR 2?
038C 0321  1D   1   380               FOR     1              !1
038D 0318  1E   2   381               FOR     2              !2
038E 0324  46       382               XAB                    !DESIRED B-LOWER TO B-LOWER
038F 03A4  02       383               RT                     !
0390 0315  00         0
0391 0332  00         0
0392 0339  00         0
0393 033C  00         0
0394 033E  00         0
0395 0 AF  00         0
0396 0 97  00         0
0397 0 BB  00         0
0398 0 B5  00         0
0399 0 A2  00         0
039A 0 B1  00         0
039B 0 B8  00         0
039C 0 9C  00         0
039D 0 BF  00         0
039E 0 A7  00         0
039F 0 93  00         0
03A0 0 B9  00         0
03A1 0 A4  00         0
03A2 0 92  00         0
03A3 0 49  00         0
03A4 0384  00         0
03A5 039A  00         0
03A6 038D  00         0
03A7 0386  00         0
03A8 0368  00         0
03A9 039D  00         0
03AA 03AE  00         0
03AB 0387  00         0
03AC 033B  00         0
03AD 039D  00         0
03AE 0365  00         0
03AF 0333  00         0
03B0 0399  00         0
03B1 036C  00         0
03B2 0396  00         0
03B3 03AB  00         0
03B4 0395  00         0
03B5 03AA  00         0
03B6 0385  00         0
03B7 036A  00         0
03B8 0390  00         0
03B9 03BE  00         0
03BA 03BF  00         0
03BB 039F  00         0
03BC 03BE  00         0
03BD 0387  00         0
03BE 03A3  00         0
03BF 03A1  00         0
                    384               ORG     #3C0           !*** PRIMARY SUBROUTINE PAGE ***
03C0 03C0  F7 0383  385       LO>$    T       LO>$1
03C1 03F0  FF 0380  386       LO>$A   T       LO>A1
03C2 03D0  CF 0387  387       B_X>B   T       B_XB1
                    388       ******* 4?INT?-- BACK TO MAIN LOOP IF 4/2 IS INTERRUPTING, ELSE RETURN
                    389       4?INT?  EQU     *
03C3 03C8  22   2   390               LBL     $H2            !
03C4 03C4  1F   3   391               NOP                    !
03C5 03C2  00       391               NOP                    !
03C6 03E1  08   1   392               SKBF    $H?S           !
03C7 03F0  B3 03C9  393               T       *+2            !
03C8 03D8  02       394               PT                     !
03C9 03CC  3F   0   395               TL      ZIO            !GO DROP ALL LINES & SEE WHAT 4/2 WANTS
03CA 03C6  FF 0000  395
                    396       ******* BUMP--INCREMENT A TWO-DIGIT NUMBER
03CB 03F3  28  11   397       BUMPC   LB      CNT0           !
03CC 03D1  29   9   398       BUMPB   LB      BLX            !
03CD 03F8  0D       399       BUMP    RC                     !
03CE 03D4  71   1   400               LAL     1              !
03CF 03CA  40       401               AC                     !
03D0 03F5  5C   0   402               XDSK                   !
03D1 03F2  70   0   403               LAL     0              !
03D2 03F9  40       404       ACXDSK  AC                     !
03D3 03FC  5C   0   405               XDSK                   !
```

| HADR | PADR | TXT | APG | STMT | SOURCE | STATEMENT | | |
|------|------|-----|-----|------|--------|-----------|---|---|
| 0304 | 03DE | 02 | | 406 | | RT | | |
| | | | | 407 | ******* | | | |
| 0305 | 03FF | 70 | 0 | 408 | ZERO2 | LAI | 0 | |
| 0306 | 03D7 | 5C | 0 | 409 | | XDSK | | |
| 0307 | 03CB | 70 | 0 | 410 | ZERO | LAI | 0 | |
| 0308 | 03C5 | 78 | 8 | 411 | EIGHT | LAI | 8 | |
| 0309 | 03E2 | 58 | 0 | 412 | | X | | |
| 030A | 03F1 | 02 | | 413 | | RT | | |
| | | | | 414 | ******* | | | |
| 030B | 03EB | 27 | 7 | 415 | SLBATR | LB | #07 | |
| 030C | 03DC | 21 | 1 | 416 | SLBH1 | LB | #01 | |
| 030D | 03CE | 22 | 2 | 417 | SLBH2 | LB | #02 | |
| 030E | 03E7 | 23 | 3 | 418 | SLBH3 | LB | #03 | |
| 030F | 03D3 | 24 | 4 | 419 | SLBH4 | LB | #04 | |
| 03E0 | 03C9 | 00 | | 420 | | NOP | | |
| 03E1 | 03E4 | 1F | 3 | 421 | SEOR | EOR | 3 | |
| 03E2 | 03D2 | 02 | | 422 | | RT | | |
| | | | | 423 | ******* SENDC--SEND A CHARACTER FROM S TO SERIAL BUS (DOESN'T ALTER AC) | | | |
| 03E3 | 03E9 | 20 | 0 | 424 | SENDC | LBI | $RDY | |
| 03E4 | 03E4 | 1F | 3 | 424 | | | | |
| 03E5 | 03DA | 00 | | 425 | | NOP | | |
| 03E6 | 03FD | 10 | 1 | 426 | | SB | $RDYS | |
| 03E7 | 03F6 | 4D | | 427 | | IOS | | |
| 03E8 | 03EB | A2 | 03F9 | 428 | | T | *+1 | !2-BIT DELAY |
| 03E9 | 03DD | 91 | 03FA | 429 | | T | *+1 | !2-BIT DELAY |
| 03EA | 03EE | 38 | 7 | 430 | | TL | RB | !4-BIT DELAY! GO "RESET BIT" AND RT |
| 03EB | 03F7 | F1 | 0104 | 430 | | | | |
| | | | | 431 | ******* AT>BL--CONVERT ATTN TO (IN BUFF) TO B-LOWER VALUE IN AC; BUT IF | | | |
| | | | | 432 | ******* BUFF CONTAINS 15 (PSEUDO ATTN ID), GO SEND KERNEL TO 4/2. | | | |
| 03EC | 05DB | 20 | 0 | 433 | AT>BL | LBI | BUFF | |
| 03ED | 03CD | 10 | 1 | 433 | | | | |
| 03EE | 03EA | 50 | 0 | 434 | | L | | !MSD-- 9, PC-- 8, BERKEL-- 7, KERNEL--15 |
| 03EF | 03F3 | 64 | 4 | 435 | | ATSK | 4 | !MSD--13, PC--12, BERKEL--11, KERNEL--NOSKIP |
| 03F0 | 03D9 | 93 | 03F1 | 436 | | T | *+1 | !4/2 WANTS A KERNEL! (WHAT A DUMMY!) |
| 03F1 | 03EC | 27 | 7 | 437 | | LB | FLAGS | |
| 03F2 | 03D6 | 15 | 2 | 438 | | RB | BERFLG | |
| 03F3 | 03FB | 34 | 11 | 439 | | SKAEI | 11 | !BERKEL? |
| 03F4 | 03D5 | 64 | 4 | 439 | | | | |
| 03F5 | 03FA | 02 | | 440 | | RT | | !NO |
| 03F6 | 03F5 | 11 | 2 | 441 | | SB | BERFLG | !SET BERKEL FLAG |
| 03F7 | 03FA | 78 | 8 | 442 | | LAI | 8 | !YES |
| 03F8 | 03FD | 02 | | 443 | AT>BLR | RT | | !MSD--13, PC--12, BERKEL-- 8 |
| | | | | 444 | ********ABF>BX--ADDRESS OF BUFF TO B_X | | | |
| 03F9 | 03FE | 28 | 8 | 445 | ABF>BX | LB | BUX | |
| 03FA | 03FF | 71 | 1 | 446 | | LAI | 1 | |
| 03FB | 03DF | 54 | 0 | 447 | | XNSK | | |
| 03FC | 03CF | B4 | 0307 | 448 | | T | ZERO | |
| 03FD | 03C7 | 00 | | 0 | | | | |
| 03FE | 03C3 | 00 | | 0 | | | | |
| 03FF | 03C1 | 00 | | 0 | | | | |
| | | | | 449 | | END | | |

SCALE SUBSYSTEM PROCESSOR PROGRAM

| | | | | | | | | |
|---|---|---|---|---|---|---|---|---|
| | | | | 1033 | * | | | **********UPDATE SAMPLECOUNTER & READ NEW SAMPLE |
| 326 | 320 | 12 | 2 | 1034 | UPDTCNTR | LB | R02 | |
| 327 | 336 | 40 | 0 | 1035 | | LAI | 0 | |
| 328 | 338 | 70 | | 1036 | | ACSK | | CARRY = 1 |
| 329 | 310 | CC | 32F | 1037 | | T | WTINP0 | |
| 32A | 32E | 54 | 0 | 1038 | | XDSK | 0 | |
| 32B | 337 | C9 | 327 | 1039 | | T | *-4 | |
| 32C | 319 | 18 | 8 | 1040 | | LB | M.WEIGH | LAST WEIGHTSAMPLE - DELAYED INPUT |
| 32D | 300 | 26 | 3 | 1041 | | RB | F.WEIGH | |
| 32E | 326 | 2F | | 1042 | | RT | | CARRY := 1 |
| 32F | 333 | 5C | 0 | 1043 | WTINP0 | X | 0 | NOT LAST WEIGHT SAMPLE - INPUT NOW |
| 330 | 319 | 76 | | 1044 | | I2C | | READ WT UNITS |
| 331 | 32C | 17 | 7 | 1045 | | LB | R07 | |
| 332 | 316 | 5C | 0 | 1046 | | X | 0 | |
| 333 | 32A | 70 | | 1047 | | SOS | | RESET NEW WEIGHTSAMPLE |
| 334 | 315 | 71 | | 1048 | | ROS | | |
| 335 | 32A | 2F | | 1049 | | RT | | CY := 0 |
| | | | | 1050 | * | | | |
| | | | | 1051 | * | | | **********SET UP MESSAGE REGISTER |
| 336 | 335 | 1404 | 2A | 1052 | MESSAGE1 | LBL | M.MESAGE | |
| 338 | 330 | 54 | 0 | 1053 | | XNSK | 0 | STORE STATUS |
| 339 | 33E | 40 | 0 | 1054 | | LAI | 0 | |
| 33A | 33F | 54 | 0 | 1055 | | XNSK | 0 | WEIGHT := 0 |
| 33B | 31F | C1 | 339 | 1056 | | T | *-2 | |
| 33C | 30F | 2F | | 1057 | | RT | | |
| | | | | 1058 | * | | | |
| | | | | 1059 | | ORG | #340 * | |
| | | | | 1060 | * | | | SUB - TRANSMISSION |
| | | | | 1061 | * | | | ***************** |
| | | | | 1062 | * | | | |
| 340 | 340 | 1404 | 2A | 1063 | TXW1DNV | LBL | M.MESAGE | |
| 342 | 350 | 4C | C | 1064 | | LAI | #C | INDICATE DATA INVALID |
| 343 | 348 | 5C | 0 | 1065 | | X | 0 | |
| 344 | 344 | C4 | 368 | 1066 | | T | TXW3 | GOTO SET "ACKN" |

```
                     1067 *
345 342  35FF 280    1068 TSTOA     TL     TSTO
                     1069 *
                     1070          EJECT
347 370  30C3 303    1071 INI3AA    TL     INI3A
                     1072 *
349 34C    27   4    1073 TPB       RR     F.TXERR  *** CLR TX ERROR WHEN ATTN GOES LOW
34A 345    15   5    1074           LR     S.ACK    ACKN :=0
34B 363    71        1075           ROS
34C 351    2F        1076           RT
                     1077 *
                     1078 *                         ******TEST SIGNAL OFF?
34D 348    01        1079 TSTOFF?   SKISL
34E 354    C4 368    1080           T      TXW3     ON -->STILL IN TESTMODE
34F 34A    24   1    1081           RR     F.TEST   OFF --> RESTART NORMAL WEIGHING
350 345    A8 7EA    1082           TM     TXW1DTNV DATA NOT VALID
351 372  140F  74    1083           LRL    R.NW
353 37C    45   6    1084           LAI    6
354 35F    5A   0    1085           XDSK   0        STORE ALL 6'S IN R.NW TO CREATE MOTION
355 36F    C3 353    1086           T      *-2
356 357  3FFF   0    1087           TL     BEGN     RESTART NORMAL WEIGHING
                     1088 *
                     1089 *                         **********RESET IND ON & DATA NOT VALID
358 345    A2 7ED    1090 TX0       TM     RESETDNV
                     1091 *                         **********:-:-:- TX BEGIN -:-:-:******
                     1092 *
359 362    18   8    1093 TX1       LR     M.TXERR  PREVIOUS TX ERROR?
35A 371    03        1094           INTOH           ATTN = 1?
35B 378    F3 349    1095           T      TRB      ATTN =0 CLEAR PREV ERROR
35C 35C    28   4    1096           SKBF   F.TXERR  ATTN = 1 WAS LAST TX IN ERROR?
35D 34E    2F        1097           RT              YES TX NOT ALLOWED UNTIL ATTN =0 AND 1 AGAIN
                     1098 *
                     1099 *                         ***RESET OR TEST SIGNALS CHANGED?
35E 357    19   9    1100 TXW0      LR     M.RESET
35F 353    2A   4    1101           SKBF   F.RESET
360 349    C4 368    1102           T      TXW3     NOT CHECKED IF IN RESET MODE
361 364    01        1103           SKISL           RESET SIGNAL ON?
362 352    CF 347    1104           T      INI3AA   YES --> INITIALISE
363 369    18   8    1105           LR     M.TEST   NO
364 374    28   1    1106           SKBF   F.TEST
365 34A    D7 34D    1107           T      TSTOFF?  SW TEST ON -->CHECK TEST SIGNAL
366 360    01        1108           SKISL           TEST NOW SET ON?
367 376    FD 345    1109           T      TSTOA    YES --> TESTPROCEDURE
                     1110 *
                     1111 *          EJECT
                     1112 *                         **********SENDING & RECEIVING *********************
368 378    15   5    1113 TXW3      LR     S.ACK
369 350    70        1114           SOS             ***ACK := 1
36A 36F    18   8    1115           LR     M.WEIGH
36B 377    2A   3    1116           SKBF   F.WEIGH  BYPASS EXTRA SUB-LEVEL IF NOT WEIGHING
36C 35B    A9 7F2    1117 TXW4      TM     WTINPUT
36D 340  180A  23    1118           LRL    M.FTX
36E 373    4A   A    1119           LAI    FTX      STORE ETX CHARACTER
370 359    5C   0    1120           X      0
371 34C    4A   A    1121           LAI    #A       BEGIN PTR IN MESSAGE
372 356  31FF 380    1122           TL     TXW2
                     1123 *
                     1124 *
374 355    42   2    1125 DIFFA     LAI    2
375 34A    43   3    1126 DIFFB     LAI    3
376 375    19   9    1127           LR     M.MOTION
377 37A    29   2    1128           SKBF   F.TWOSTB
378 370    6F   F    1129           AJSK   F
379 37E    14   4    1130           LR     R.04
37A 37F    2F        1131           RT
                     1132 *
37B 35F 3035FF 680   1133 DEADZEXL  TLB    DEADZXL
                     1134 *
                     1135          EJECT
                     1136          ORG   #380 *
                     1137 *                         ----- DIGIT SEND LOOP -----
380 380    75        1138 TXW2      LXA
381 340    76        1139           LBA
382 390    50   0    1140           L      0        DATA TO ACCU
383 388    77        1141           COM             IOS-INSTR INVERTS!!
384 384    12   2    1142           LR     S.SEND
385 382    70        1143           SOS             SEND MODE
386 3A1    14   4    1144           LR     S.RDYOUT
387 390    70        1145           SOS             READY :=1
388 398    74        1146           XAS
389 3BC    20        1147           IOS             SEND DATA SERIALLY
38A 386    18   8    1148           LR     M.WEIGH
38B 3A3    2A   3    1149           SKBF   F.WEIGH  BYPASS EXTRA SUB-LEVEL IF NOT WEIGHING
38C 391    AA 7F4    1150           TM     WTACCU   WT-UNITS ACCUMULATED IF WEIGHING
38D 3AF    FA 33E    1151           T      *+1
38F 394    F5 38F    1152           T      *+1
3BF 3AA    14   4    1153           LR     S.RDYOUT
390 3A5    CD 391    1154           T      *+1
391 3A2    71        1155           ROS             READY :=0
392 389    12   2    1156           LR     S.SEND
393 3BC    71        1157           ROS             RECEIVE MODE
394 39F    79        1158           XAX
395 3AF    75        1159           LXA
```

```
396 397   67   7   1160           AISK  7           ---ETX CHARACTER SEND?---
397 3B8   00 399   1161           T     TXRDY=1? NO
39A 3A5   CA 396   1162           T     TATO    YES -- GOTO END OF TX
399 3A2   13   3   1163 TXRDY=1? LB    S.RDYIN
39A 3A1   4F   F   1164           LAI   F
398 3A8   01      1165           SKISL             READY-IN = 1 ?
39C 39C   F6 3A0   1166           T     TXRDY=0? YES, PROCEED
390 3AE   6F   F   1167           AISK  F           NO - CHECK TIMEOUT
39E 3A7   C7 399   1168           T     *-3
39F 393   F8 3B0   1169           T     TXER    TIMEOUT ON RDY = 1 ?
                   1170  *
                   1171           EJECT
3A0 3A9   40   0   1172 TXRDY=0? LAI   0
3A1 3A4   13   3   1173           LB    S.RDYIN
3A2 392   61   1   1174           AISK  1
3A3 3A9   F8 3B0   1175           T     TXER    TIMEOUT ON RDY = 0 ?
3A4 3A4   01      1176           SKISL             READY-IN = 0 ?
3A5 39A   FD 3A2   1177           T     *-3
3A6 3A0   0A   2   1178           EOR   2
3A7 3B6   79      1179           XAX
3A8 3B8   75      1180           LXA
3A9 390   76      1181           LRA
3AA 3AE   74      1182           XAS            ----DATA RXED TO ACCU
3AB 3A7   00      1183           NOP
3AC 398   7F      1184           SKMEA          ----COMPLEMENT OF DATA SEND?
3AD 3B0   CA 396   1185           T     TATO    NO, ERROR
3AE 3A6   1B   8   1186           LB    M.WEIGH
3AF 383   2A   3   1187           SKBF  F.WEIGH BYPASS EXTRA SUB-LEVEL IF NOT WEIGHING
3B0 399   A9 7F2   1188           TM    WTINPUT INPUT WT-UNITS IF REQD & READY
3B1 3AC   0A   2   1189           EOR   2
3B2 3B6   79      1190           XAX
3B3 3AB   61   1   1191           AISK  1           DATA PTR UPDATE
3B4 395   48   8   1192           LAI   8           8=M.ETX -- END
3B5 3AA   FF 3B0   1193           T     TXW2    ----END OF DIGIT SEND LOOP
                   1194  *
                   1195  *
                   1196  *                              --------END OF TX
3B6 3B5   15   5   1197 TATO     LB    S.ACK
3B7 3B4   71      1198           ROS             ACKN = 0
3B8 3B0   4F   F   1199           LAI   F
3B9 3BF   03      1200           INTOH           ATTN = 0 ?
3BA 3BF   FE 3BF   1201           T     TAT1
3BB 39F   6F   F   1202           AISK  F
3BC 3AF   C1 3B9   1203           T     *-3
                   1204  *
                   1205  *                         ----TXERROR = ATTENTION LEFT HIGH AT END TX
3BD 3A7   1B   8   1206 TXER     LB    M.TXERR
3BE 3B3   23   4   1207           SB    F.TXERR
3BF 3B1   2F .    1208 TAT1     RT              :-:-:-:-: TX ENDED :-:-:-:-:
                   1209  *                              EXCEPT IF CHANGING "TEST" OR "RESET"
                   1210  *
                   1211           EJECT
                   1212  *       ****************************************
                   1213  *                  MAIN PROGRAM -:- INITIALISE  ***************
                   1214  *       ****************************************
                   1215  *
                   1216           ORG   #3C0      ***************BEGINADDRESS OF CPU*****
                   1217  *
3C0 3C0   05      1218 INIT     RC
3C1 3E0 303A90 559 1219           TMLB  WTBRDRST RESET WT-BOARD
3C4 3C4   1F   F   1220           LB    R0F
3C5 3C2   95 7F5   1221           TM    TSTB    CLR INDICATORS & TEST DIGITS
3C6 3E1   82 7ED   1222           TM    RESETDNV SET "RESET" FLAG & MESSAGE := DATA NOT VALID
                   1223  *
3C7 3F0   12   2   1224 WAITST   LB    R02
3C8 3DA   48   8   1225           LAI   8         CNTR := 888 (HEX)
3C9 3CC   5B   0   1226           XDSK  0
3CA 3C6   E7 3C8   1227           T     *-2
                   1228  *
3CB 3E3   8B 7C4   1229 WAIT1SEC TM    A>B        DELAY 1 SEC
3CC 3D1   A2 7E9   1230           TM    TX
3CD 3FA   06      1231           SC
3CE 3D4   3392 326 1232           TML   UPDTCNTR
3D0 3E5   02      1233           SKNC
3D1 3F2   E1 3D4   1234           T     INI3
3D2 3F9   DC 3C9   1235           T     WAIT1SEC
                   1236  *
                   1237  *                         **************INITIALISE REGS & WT-BOARD****
3D3 3FC   A8 7E9   1238 INI3A    TM    TXWIDTNV
3D4 3D5   13   3   1239 INI3     LB    R03
3D5 3FF   2A   1   1240           SKBF  1
3D6 3D7   F4 3DA   1241           T     *+2
3D7 3CB   B2 7ED   1242           TM    RESETDNV SET "RESET" FLAG & MESSAGE := DATA NOT VALID
3D8 3C5   A2 7E9   1243           TM    TX
3D9 3F2 303A90 559 1244           TMLB  WTBRDRST RESET WT-BOARD
3DC 3DC   04      1245           INTIL            NEW WEIGHTSAMPLE READY?
3DD 3CF   EC 3DF   1246           T     *+2       NO
3DE 3E7   A5 7F7   1247           TM    ALARMF   YES -- WEIGHING-ERROR
3DF 3D3   A2 7E9   1248           TM    TX
3E0 3C9   13   3   1249           LB    R03
3E1 3E4   2B   1   1250           SKBF  1
3E2 3D2   FA 3F4   1251           T     INI3AZ
                   1252  *
```

```
                   1253        EJECT
                   1254 *                                TEST & CLR REGS 7 -> 0
3F3 3F9   0F  7    1255        FOR   7
3F4 3F4   95 7F5   1256        TM    TSTB
3F5 3DA   0E  6    1257        EOR   6
3F6 3FD   95 7F5   1258        TM    TSTB
3F7 3F6   0D  5    1259        FOR   5
3F8 3F8   95 7F5   1260        TM    TSTB
3F9 3DD   0C  4    1261        EOR   4
3EA 3EF   95 7F5   1262        TM    TSTB
3FB 3F7   0B  3    1263        EOR   3
3EC 3DA   95 7F5   1264        TM    TSTB
3ED 3CD   0A  2    1265        EOR   2
3EE 3E6   95 7F5   1266        TM    TSTB
3EF 3F3   09  1    1267        EOR   1
3F0 3D9   95 7F5   1268        TM    TSTB
3F1 3EC   95 7F5   1269        TM    TSTB
                   1270 *                           ***** NEW WEIGHTSAMPLE READY?
3F2 3D6   04       1271        INTIL
3F3 3EB   A5 7F7   1272        TM    ALARMF  NO --> WEIGHING ERROR
3F4 3D5 3D34F5 6CF 1273 INI3AZ TLB   INI3AZVL
                   1274 *
                   1275 *
                   1276 *                           XXXXX-> MACHINE DEAD ::: ONLY TRANSMISSION <-XXXXX
3F7 3FA   A6 7F0   1277 M.C.KILL TM  MESSAGE STORE ERROR CODE
3F8 3FD 3D3DBF 480 1278 M.C.ZEVL TMLB DISPLAY
3F9 3DF   A2 7E9   1279 M.C.DEAD TM  TX      TX WHEN REQUESTED
3FC 3CF   13  3    1280        LB    P03
3FD 3C7   20  1    1281        SR    1
3FE 3C3   CF 3C7   1282        T     WAITST  SEND ERROR CODE AND HAVE ANOTHER TRY
                   1283 *
                   1284        EJECT
```

POSTAGE PRINTER SUBSYSTEM PROCESSOR PROGRAM

```
ADR PADR TXT ARG  STMT   SOURCE STATEMENT
                  478           ORG    #180
180 0180 18   8   479    CM26   LB     ACKN           !POINT TO ACKNOWLEDGE LINE
181 01A0 71       480           ROS                   !LOWER ACKNOWLEDGE LINE
182 0190 03       481           INTOH                 !ATTENTION LOW ?
183 0188 FD 0185  482           T      *+2            !YES
184 0184 EE 0182  483           T      *-2            !NO
185 0182 19   9   484    COMM1  LB     STAT           !POINT TO STATUS WORD
186 01A1 50   0   485           L                     !LOAD STATUS
187 0180 18   8   486           LB     TEMP           !POINT TO COMMAND WORD
188 0198 5C   0   487           X                     !SAVE STATUS
189 018C 50   0   488           L                     !LOAD STATUS
18A 0186 74       489           XAS                   !STATUS TO S REGISTER
18B 01A3 71       490           ROS                   !LOWER ACKNOWLEDGE LINE
18C 0191 18  11   491           LB     CMFLG
18D 01A8 40   0   492    CM1    LAI    0              !PREPARE FOR CHANNEL 1 INPUT
18E 0194 60       493           IISK                  !GET RESET SIGNAL
18F 018A 00       494           NOP                   !UNCONDITIONAL SKIP
190 01A5 5C   0   495           X                     !SAVE RESET SIGNAL
191 018E 29   2   496           SKBF   2              !RESET METER 1 ?
192 0189 EA 0184  497           T      CM23           !YES
193 016C 2A   3   498           SKBF   3              !NO, RESET METER 2 ?
194 019E C5 0187  499           T      CM24           !YES
195 01AF 5C   0   500           X                     !NO, RESTORE CMLFG
196 0197 03       501           INTOH                 !S/P WANT TO TALK ?
197 018H D7 0180  502           T      CM1            !NO
198 0185 18   8   503           LB     ACKN           !YES; POINT TO ACKNOWLEDGE LINE
199 01A2 70       504           SOS                   !RAISE ACKNOWLEDGE LINE
19A 0181 19   9   505           LB     STAT           !POINT TO STATUS WORD
19B 01B5 47   7   506           LAI    7              !ASSUME STATUS IS GOOD
19C 019C 5C   0   507           X                     !SAVE GOOD STATUS
19D 018E BF 07C0  508           TM     XMT            !SEND A WORD TO THE SYSTEM PROCESSOR
19E 01A7 77       509           COM                   !RESTORE COMPLEMENTED STATUS
19F 0193 7F       510           SKMEA                 !STATUS DATA CORRECT ?
1A0 0189 FF 0180  511           T      CM26           !NO
1A1 01A4 BF 07C0  512           TM     XMT            !SEND A WORD TO THE SYSTEM PROCESSOR
1A2 0192 5C   0   513           X                     !SAVE COMMAND
1A3 01A9 50   0   514           L
1A4 0184 77       515           COM                   !COMPLEMENT TO SEND TO S/P
1A5 019A 74       516           XAS                   !COMPLEMENT TO S REGISTER
1A6 01AB BF 07C0  517           TM     XMT            !SEND A WORD TO THE SYSTEM PROCESSOR
1A7 01B6 28   4   518           SKBF   4              !POWER ON OR SET COMMAND ?
1A8 01BB CC 01AF  519           T      CM27           !YES
1A9 019D 71       520           ROS                   !NO, LOWER ACKNOWLEDGE LINE
1AA 01A6 2A   3   521           SKBF   3              !PRINT COMMAND ?
1AB 0187 38   7   522           TL     CM7            !YES
1AC 0198 FF 01C0  522
1AD 01B0 35  10   523           TL     CM34           !NO, THEREFORE SELECT COMMAND
1AE 01A6 F5 028F  523
1AF 01B3 2A   3   524    CM27   SKBF   3              !WHICH ONE ?
1B0 0199 36  15   525           TL     PW2            !POWER ON
1B1 01AC C3 03D3  525
1B2 0196 36   9   526           TL     CM4            !SET COMMAND
1B3 01AB FF 0240  526
```

| HADR | PADR | TXT | ARG | STMT | SOURCE | STATEMENT | | |
|---|---|---|---|---|---|---|---|---|
| 0184 | 0195 | 5C | 0 | 527 | CM23 | X | | !RESTORE CMFLG |
| 0185 | 01AA | 27 | 4 | 528 | | RB | 4 | !RESET FOR METER 1 |
| 0186 | 0185 | C1 | 0189 | 529 | | T | CM29 | !GO SHARE CODE |
| 0187 | 018A | 5C | 0 | 530 | CM24 | X | | !RESTORE CMFLG |
| 0188 | 018D | 23 | 4 | 531 | | SB | 4 | !SET FOR METER 2 |
| 0189 | 0185 | 1A | 10 | 532 | CM29 | LB | FLAG | !POINT TO RESET/SET-UP FLAG |
| 018A | 018F | 20 | 1 | 533 | | SB | 1 | !SET RESET FLAG |
| 018B | 019F | 30 | 15 | 534 | | TL | PW1 | !GO SHARE POWER ON CODE |
| 018C | 018F | F4 | 03D7 | 534 | | | | |
| 018D | 0187 | 00 | | 0 | | | | |
| 018E | 0103 | 00 | | 0 | | | | |
| 018F | 0181 | 00 | | 0 | | | | |
| | | | | 29 | | ORG | #7C0 | |
| 01C0 | 07C0 | 19 | 9 | 30 | XMT | LB | RDYO | !POINT TO RDY0 OUT LINE |
| 01C1 | 07E0 | 70 | | 31 | | SOS | | !SET IT HIGH FOR DATA ENVELOPE |
| 01C2 | 07D0 | 2D | | 32 | | IOS | | !SHIFT OUT S REGISTER |
| 01C3 | 07C8 | 42 | 2 | 33 | | LAI | 2 | !DELAY |
| 01C4 | 07C4 | 6F | 15 | 34 | | AISK | 15 | !WHILE |
| 01C5 | 07C2 | BB | 07C4 | 35 | | T | *-1 | !SENDING |
| 01C6 | 07E1 | 71 | | 36 | | ROS | | !CLOSE DATA ENVELOPE |
| 01C7 | 07F0 | 03 | | 37 | | INTOH | | !DOES S/P WANT TO TALK ? |
| 01C8 | 07D8 | 97 | 07CD | 38 | | T | RC1 | |
| 01C9 | 07CC | 04 | | 39 | | INTIL | | !IS READY HIGH ? |
| 01CA | 07C6 | AE | 07CC | 40 | | T | *+2 | !YES |
| 01CB | 07E3 | BF | 07C7 | 41 | | T | *-4 | |
| 01CC | 07D1 | 03 | | 42 | | INTOH | | !DOES S/P WANT TO TALK ? |
| 01CD | 07E8 | 39 | 6 | 43 | RC1 | TL | COMM1 | !NO, GO START COMMUNICATIONS AGAIN |
| 01CE | 07D4 | FD | 0185 | 43 | | | | |
| 01CF | 07CA | 04 | | 44 | | INTIL | | !IS READY HIGH ? |
| 01D0 | 07E5 | AE | 07CC | 45 | | T | *-4 | !YES |
| 01D1 | 07F2 | 74 | | 46 | | XAS | | !NO, DATA TO ACCUMULATOR |
| 01D2 | 07F9 | 18 | 8 | 47 | | LB | TEMP | !POINT TO TEMPORARY RAM |
| 01D3 | 07FC | 2F | | 48 | | RT | | |
| 01D4 | 07DF | 1F | 15 | 49 | TIM30 | LB | 15 | !DELAY 30 MILLISECONDS |
| 01D5 | 07EF | 4A | 0 | 50 | | LAI | 0 | |
| 01D6 | 07D7 | 58 | 0 | 51 | | XDSK | | |
| 01D7 | 07CB | 48 | 10 | 52 | | LAI | 10 | |
| 01D8 | 07C5 | 58 | 0 | 53 | | XDSK | | |
| 01D9 | 07E2 | 40 | 0 | 54 | TM2 | LAI | 0 | |
| 01DA | 07F1 | 58 | 0 | 55 | | X | | |
| 01DB | 07FB | 05 | | 56 | TM1 | RC | | |
| 01DC | 07DC | 4F | 15 | 57 | | LAI | 15 | |
| 01DD | 07CE | 7C | | 58 | | AC | | |
| 01DE | 07E7 | 54 | 0 | 59 | | XNSK | | |
| 01DF | 07D3 | A3 | 07DC | 60 | | T | *-3 | |
| 01E0 | 07C9 | 1D | 13 | 61 | | LB | 13 | |
| 01E1 | 07E4 | 02 | | 62 | | SKNC | | |
| 01E2 | 07D2 | 8F | 07DB | 63 | | T | TM1 | |
| 01E3 | 07E9 | 2F | | 64 | | RT | | |
| 01E4 | 07F4 | 1F | 15 | 65 | TIM200 | LB | 15 | !DELAY 200 MILLISECONDS |
| 01E5 | 07DA | 44 | 4 | 66 | | LAI | 4 | |
| 01E6 | 07E0 | 58 | 0 | 67 | | XDSK | | |

PERIPHERAL SUBSYSTEM PROCESSOR PROGRAM

NAME MM77        CAP477/11, PPS-4/1 MM77/MM78 cross-assembler version 1.9

| FL | BADR | PADR | CD | ARG | ST NO | | STATEMENT | | |
|---|---|---|---|---|---|---|---|---|---|
| | | | | 40 | 00177 | | ORG | #040 | !!!!! |
| | 0040 | 0046 | 9D | 07D9 | 00178 | BUSRQ4 | TM | PACZR | |
| | 0041 | 0060 | 18 | 0078 | 00179 | | LBL | PFBR | BUS REQUEST |
| | 0042 | 0050 | 0F | | | | | | |
| | 0043 | 0048 | 20 | 0001 | 00180 | | SB | 1 | |
| | | | | 44 | 00181 | BUSRQ1 | EQU | * | |
| | 0044 | 0044 | 27 | 0234 | 00182 | | TL | PERPOL | |
| | 0045 | 0042 | EA | | | | | | |
| | | | | 46 | 00183 | IDLPR | EQU | * | |
| | 0046 | 0061 | 19 | 0069 | 00184 | | LBL | PCS1 | |
| | 0047 | 0070 | 0E | | | | | | |
| | 0048 | 0056 | 39 | 0000 | 00185 | | L | | |
| | 0049 | 004C | 61 | 0001 | 00186 | | AISK | 1 | IS IT 'F' ? |
| | 004A | 0046 | C6 | 0052 | 00187 | | T | IDL7 | YES |
| | 004B | 0063 | 18 | 0078 | 00188 | | LBL | PFBR | NO |
| | 004C | 0057 | 0F | | | | | | |
| | 004D | 0069 | 22 | 0003 | 00189 | | SB | 3 | SET ERROR FLAG |
| | 004E | 0054 | 19 | 0059 | 00190 | | LBL | PCS1 | |
| | 004F | 004A | 0E | | | | | | |
| | 0050 | 0065 | 18 | 0068 | 00191 | IDL2 | LBL | PCS2 | STATUS WORD TO ACC |
| | 0051 | 0072 | 0E | | | | | | |
| | 0052 | 0079 | 50 | 0000 | 00192 | IDL7 | L | 0 | |
| | 0053 | 007C | 74 | | 00193 | | XAS | | |
| | 0054 | 005E | 19 | 0009 | 00194 | | LB | RDYOUT | |
| | 0055 | 006F | 70 | | 00195 | | SOS | | !RAISE RDY |
| | 0056 | 0057 | 2D | | 00196 | | IOS | | SHIFT OUT STATUS WORD |
| | 0057 | 004B | 8D | 07D1 | 00197 | | TM | TORT | |
| | 0058 | 0045 | 8D | 07D1 | 00198 | | TM | TORT | |
| | 0059 | 0062 | 71 | | 00199 | | ROS | | !LOWER RDY |
| | 005A | 0071 | B4 | 07D7 | 00200 | | TM | RDYCK | |
| | 005B | 0078 | 2F | | 00201 | | RT | | |

NAME MM77    CAP477/11, PPS-4/1 MM77/MM78 cross-assembler version 1.9

```
FL  BADR PADR CD  ARG   ST NO          STATEMENT 005C 905C 74        00202          XAS                YES. GET DATA
    005D 904E 02        00203          SKNC
    005E 0067 18 0003   00204          LB    *08
    005F 0058 19 0009   00205          LB    *09
    0060 0049 00        00206          NOP
    0061 0054 9E 0066   00207          EOB   6
    0062 0052 77        00208          COM
    0063 0049 7F        00209          SKMEA              ]COMPARE STATUS AND STATUS BAR
    0064 0074 CA 0076   00210          T     IDL41        XMISSION NO GOOD
    0065 0054 02        00211          SKNC
    0066 006D E2 0069   00212          T     IDL9         2ND WORD SENT
    0067 0070 06        00213          SC
    0068 007B DA 0050   00214          T     IDL2         GO BACK FOR 2ND WORD
                        00215   ***    STATUS WORDS SENT TO S. P.  PULSE RDY.
    0069 005D 19 0009   00216   IDL9   LB    RDYOUT
    006A 006E 70        00217          SOS                PULSE RDY
    006B 0077 CB 07D1   00218          TM    TORT
    006C 0058 ED 07D1   00219          TM    TORT
    006D 004D 71        00220          ROS
    006E 0065 18 0078   00221          LBL   PFER
    006F 0073 0F        
    0070 0039 2A 0003   00222          SKBF  3            ERROR ?
    0071 006C 34 02DF   00223   POLCL  TL    POLC
    0072 0036 EC        
                    73  00224   IDL91  EQU   *
    0073 006B 9D 07D9   00225          TM    PACZR        NO
    0074 0033 19 0009   00226          LB    LOADS
    0075 006A 2A 0003   00227          SKBF  3            INPUT BUFFER LOADED ?
    0076 0075 34 02F9   00228   IDL41  TL    IDL4
    0077 007A C1        
                        00229   ***    READY TO RECEIVE SERIAL DAT FORM S. P.
    0078 007D D4 07D7   00230   SER1   TM    RDYCK
    0079 007E 9B 07E1   00231          TM    TOIDLE
    007A 007F 18 0058   00232          LBL   PAC2         CHECK COUNTER
    007B 005F 0D        
    007C 004F 49 0069   00233          LAI   0
    007D 0047 30 04C0   00234          TLB   SER4
    007E 0043 3C        
    007F 0041 FF        
                        00235
                    4C0 00236          ORG   *4C0
                        00237   ***    RDY HAS DROPPED. SERIAL DATA IS IN S REG.
                    4C0 00238   SER4   EQU   *
    04C0 04C0 7F        00239          SKMEA
    04C1 04E0 3C 00C0   00240          TL    SER5         ]
    04C2 04D0 FF        
    04C3 04CB 54 0000   00241          XNSK  0            PAC2 AND ACC. EACH HAVE A "0" SO I KAN DO IT
    04C4 04C4 65        00242          RC
    04C5 04C2 59 0000   00243          L
    04C6 04E1 7D        00244          ACSK
    04C7 04F0 E3 04DC   00245          T     SBST         ]
    04C8 04D0 2C        00246          TAB
    04C9 04CC 00        00247          NOP
    04CA 04C6 00        00248          NOP                ]
    04CB 04E3 1E 005E   00249          LBL   S8
    04CC 04D1 0D        
    04CD 04E3 1F 005F   00250          LBL   S9
    04CE 04D4 0D        
    04CF 04CA 18 0018   00251          LBL   S10
    04D0 04E5 09        
    04D1 04F2 19 0019   00252          LBL   S11
    04D2 04F9 09        
    04D3 04FC 1A 001A   00253          LBL   S12
    04D4 04DE 09        
    04D5 04EF 1B 001B   00254          LBL   S13
    04D6 04D7 09        
    04D7 04CB 1C 001C   00255          LBL   S14
    04D8 04C5 09        
    04D9 04E2 1C 005C   00256          LBL   S15
    04DA 04F1 0D        
    04DB 04F8 CC 04EF   00257          T     SBST1
    04DC 04DC 2C        00258   SBST   TAB
    04DD 04CE 00        00259          NOP
    04DE 04E7 00        00260          NOP
    04DF 04D3 18 0038   00261          LBL   S0
    04E0 04C9 0B        
    04E1 04E4 19 0039   00262          LBL   S1
    04E2 04D2 0B        
    04E3 04E9 1A 003A   00263          LBL   S2A
    04E4 04F4 0B        
    04E5 04DA 1B 003B   00264          LBL   S3A
    04E6 04ED 0B        
    04E7 04F6 14 0004   00265          LBL   S4
    04E8 04FB 08        
    04E9 04DD 15 0005   00266          LBL   S5
    04EA 04EE 08        
    04EB 04F7 16 0006   00267          LBL   S6
    04EC 04DB 08        
    04ED 04CD 17 0007   00268          LBL   S7
    04EE 04E6 08        
    04EF 04F3 74        00269   SBST1  XAS
```

NAME MM77        CAP477/11, PPS-4/1 MM77/MM78 cross-assembler version 1.9

| FL | BADR | PADR | CD | ARG | ST NO | | STATEMENT | |
|----|------|------|----|----|-------|--|-----------|--|
| | 04F0 | 04D9 | 3C | 0000 | 00270 | | X | |
| | 04F1 | 04EC | 50 | 0000 | 00271 | | L | |
| | 04F2 | 04D6 | 77 | | 00272 | | COM | |
| | 04F3 | 04EB | 74 | | 00273 | | XAS | |
| | 04F4 | 04D5 | 19 | 0099 | 00274 | | LB | #99 |
| | 04F5 | 04EA | 70 | | 00275 | | SOS | |
| | 04F6 | 04F3 | 2D | | 00276 | | IOS | |
| | 04F7 | 04FA | CD | 07D1 | 00277 | | TH | TOST |
| | 04F8 | 04FB | CD | 07D1 | 00278 | | TH | TOST |
| | 04F9 | 04FE | 71 | | 00279 | | ROS | |
| | 04FA | 04FF | 05 | | 00280 | | RC | |
| | 04FB | 04FF | 0D | 0005 | 00281 | | EOB | 3 |
| | 04FC | 04CF | 35 | 02D4 | 00282 | | THL | PACAD1 |
| | 04FD | 04C7 | AA | | | | | |
| | 04FE | 04C2 | 2E | 0078 | 00283 | | TL | SER1 |
| | 04FF | 04C1 | C2 | | | | | |
| | | | | | 00284 | | | |
| | | | | C0 | 00285 | | ORG | #0C0 |
| | 00C0 | 00C0 | 19 | 0059 | 00286 | SER5 | LBL | PAC1 |
| | 00C1 | 00E9 | 3D | | | | | |
| | 00C2 | 00C9 | 50 | 0000 | 00287 | | L | |
| | 00C3 | 00C8 | 2C | | 00288 | | TAB | |
| | 00C4 | 00C4 | 09 | | 00289 | | NOP | |
| | 00C5 | 00C2 | 09 | | 00290 | | NOP | |
| | 00C6 | 00E1 | D7 | 00CD | 00291 | | T | ZIP1 |
| | 00C7 | 00F0 | 15 | 00CF | 00292 | | T | ZIP2 |
| | 00C8 | 09D5 | CD | 00D1 | 00293 | | T | ZIP3 |
| | 00C9 | 00CC | C3 | 00D3 | 00294 | | T | ZIP4 |
| | 00CA | 00C6 | 30 | 0680 | 00295 | | TLB | SER6 |
| | 00CB | 00E3 | 85 | | | | | |
| | 00CC | 00D1 | 7F | | | | | |
| | 00CD | 00EE | 1D | 005D | 00296 | ZIP1 | LBL | S16 |
| | 00CE | 00D4 | 0D | | | | | |
| | 00CF | 00CA | 1D | 001D | 00297 | ZIP2 | LBL | S17 |
| | 00D0 | 00E5 | 69 | | | | | |
| | 00D1 | 00F2 | 1E | 001E | 00298 | ZIP3 | LBL | S18 |
| | 00D2 | 00F0 | 39 | | | | | |
| | 00D3 | 00FC | 1F | 001F | 00299 | ZIP4 | LBL | S19 |
| | 00D4 | 00DE | 09 | | | | | |
| | 00D5 | 00EF | 20 | 04EF | 00300 | | TLB | SBST1 |
| | 00D6 | 00D7 | CC | | | | | |
| | 00D7 | 00CB | CC | | | | | |
| | | | | D8 | 00301 | PINCHL | EQU | * |
| | 00D8 | 00C5 | 1A | 000A | 00302 | | LB | MASK | ] LOAD STROBE SELECTION
| | 00D9 | 00E2 | 5C | 0000 | 00303 | | X | 0 |
| | 00DA | 00F1 | 19 | 0079 | 00304 | | LBL | SECTR |
| | 00DB | 00FB | 0F | | | | | |
| | 00DC | 00DC | 40 | 0099 | 00305 | | LAI | 9 |
| | 00DD | 09CE | 5C | 0003 | 00306 | | X | |
| | 00DE | 00E7 | 13 | 0003 | 00307 | | LB | THREE |
| | 00DF | 00D3 | 70 | | 00308 | | SOS | |
| | | | | E0 | 00309 | PIN4 | EQU | * |
| | 00E0 | 00C9 | 16 | 0006 | 00310 | | LB | #06 |
| | 00E1 | 00D4 | 71 | | 00311 | | ROS | | RELEASE STROBES
| | 00E2 | 00D2 | 4F | 000F | 00312 | | LAI | 15 |
| | 00E3 | 00D9 | 75 | | 00313 | | LXA | |
| | 00E4 | 00F4 | 73 | | 00314 | | OX | | FLOAT I/O LINES
| | 00E5 | 00DA | 7B | | 00315 | | IOA | | STOP STROBES
| | 00E6 | 00ED | 70 | | 00316 | | SOS | |
| | 00E7 | 00F6 | 05 | | 00317 | | SC | |
| | 00E8 | 00FB | 19 | 0079 | 00318 | | LBL | SECTR |
| | 00E9 | 00DD | 0F | | | | | |
| | 00EA | 00E2 | 40 | 0000 | 00319 | | LAI | 0 |
| | 00EB | 00F7 | 7D | | 00320 | | ACSK | | ]TIME OUT FOR STROBE SEARCH
| | 00EC | 00DB | CC | 00EF | 00321 | | T | PIN3 |
| | 00ED | 00CD | 33 | 0300 | 00322 | | TL | PIN6 |
| | 00EE | 00E5 | FF | | | | | |
| | 00EF | 00F3 | 5C | 0000 | 00323 | PIN3 | X | 0 | LOAD NEW COUNT
| | 00F0 | 00D9 | 1A | 000A | 00324 | | LB | MASK |
| | 00F1 | 00DC | 7B | | 00325 | | ICA | |
| | 00F2 | 00F5 | 72 | | 00326 | | IX | | BRING IN STROBE & DIGIT
| | 00F3 | 00EB | 7F | | 00327 | | SKMEA | | IS IT THE SELECTED STROBE ?
| | | | | 240 | 00653 | | ORG | #240 |
| | 0240 | 0240 | 19 | 0079 | 00654 | SECZRL | LBL | SECTR |
| | 0241 | 0260 | 61 | | | | | |
| | 0242 | 0250 | 40 | 0000 | 00655 | | LAI | 0 |
| | 0243 | 0243 | 34 | 0000 | 00656 | | XNSK | |
| | 0244 | 0244 | E0 | 000C | 00657 | | SKBEI | 12 |
| | 0245 | 0242 | 6C | | | | | |
| | 0246 | 0261 | EF | 0242 | 00658 | | T | SECZRL+2 |
| | 0247 | 0270 | 2F | | 00659 | | RT | |
| | 0248 | 0258 | 1C | 007C | 00660 | JMCZRL | LBL | #7C |
| | 0249 | 024C | 0F | | | | | |
| | 024A | 0246 | 40 | 0000 | 00661 | JAM6 | LAI | 0 |
| | 024B | 0263 | 7F | | 00662 | | SKMEA | |
| | 024C | 0251 | 2F | | 00663 | | RT | |
| | 024D | 0265 | 5C | 0000 | 00664 | | INCB | |
| | 024E | 0254 | 54 | | | | | |
| | 024F | 024A | E0 | 024A | 00665 | | T | JAM6 |
| | 0250 | 0265 | 2E | | 00666 | | RTSK | |

```
NAME  MM77              CAP477/11, PPS-4/1 MM77/MM78 cross-assembler version 1.9

FL   BADR PADR CD ARG   ST NO        STATEMENT 0251 0272 13 0013  00667  ZROPB    LBL    PB11            ZERO OUTPUT BUFFER
     0252 0279 09
     0253 027C 96 07E3  00668           TM     ZEROB
     0254 025E 13 0023  00669           LBL    PB15
     0255 026F 0A
     0256 0257 96 07E3  00670           TM     ZEROB
     0257 024E 13 0043  00671           LBL    PB27
     0258 0245 0C
     0259 0262 96 07E3  00672           TM     ZEROB
     025A 0271 13 0033  00673           LBL    PB19
     025B 0278 0B
     025C 025C 96 07E3  00674           TM     ZEROB
     025D 024E 13 0053  00675           LBL    PB35
     025E 0267 0D
     025F 0258 96 07E3  00676           TM     ZEROB
     0260 0269 13 0063  00677           LBL    PB39
     0261 0254 0F
     0262 0252 96 07E3  00678           TM     ZEROB
     0263 0269 13 0073  00679           LBL    PB7
     0264 0274 0F
     0265 025A 40 0000  00680  ZEROBL   LAI    0
     0266 0260 58 0000  00681           XNSK
     0267 0276 E5 0265  00682           T      ZEROBL
     0268 027B 2F       00683           RT
     0269 025D 1B 000B  00684  RDYCKL   LB     #0B             IIS RDY HI ?
     026A 025D C4       00685           INT1L
     026B 0277 E6 0270  00686           T      RDH1            YES
     026C 025B 03       00687           INT0H                  NO. IS ATT3 HI ?
     026D 022D 30 06E2  00688  ATT3LO   TL     RDYRT
     026E 0266 ED
     026F 0273 E2 0269  00689           T      RDYCKL          ATT3 HI
     0270 0259 04       00690  RDH1     INT1L                  IIS RDY LOW ?
     0271 026C D4 0273  00691           T      CHATT3          NO. CHECK ATT3
     0272 0256 2E       00692           RTSK
     0273 026B 03       00693  CHATT3   INT0H                  IRDY HI. IS ATT3 HI ?
     0274 0255 F2 026D  00694           T      ATT3LO          NO
     0275 026A E6 0270  00695           T      RDH1            YES
               680      01520           PRG
               689      01521  SERO     EQU    *
     0689 0689 18 0073  01522           LB     ACK
     068A 06A0 71       01523           ROS
     068B 0690 03       01524           INT0H                  I WAIT FOR ATT3 TO DROP
     068C 0683 FD 0685  01525           T      *+2
     068D 0684 EF 0682  01526           T      *-2
     068E 0682 19 0099  01527           LB     LOADS
     068F 06A1 2B 0001  01528           SKBF   1
     0687 06B0 2F       01529           RT                     POWER ON ?
     0688 0698 9D 07D9  01530           TM     PACZR           YES
     0689 068C 0E C066  01531           EOB    6               LBL S1
     068A 0686 90       01532           NOP
     068B 06A3 2B 0109  01533           TL     SHEND
     068C 0691 FF
               68D      01534  SENDPL   EQU    *
                        01535  *** STUFF OVERSIZE BIT INTO PB50 ***
     068D 06A3 1E 006E  01536           LBL    PB44
     068E 0694 0E
     068F 06A7 2B 0004  01537           SKBF   4               IS IT OVERSIZED ?
     0690 06A5 18 0003  01538           LAI    3
     0691 06B2 49 0079  01539           LAI    0
     0692 06D7 1A 007A  01540           LBL    PB50
     0693 66BC 0F
     0694 069E 3C 0000  01541           X      0               SET UP NEW OVSIZE BIT
     0695 06AF 1B 000B  01542           LB     JAMR
     0696 0697 2A 0003  01543           SKBF   3               JAM OVERFLOW ?
     0697 06BB DD 0699  01544           T      SOMWH
     0698 0687 F1 009D  01545           T      SEND2L
     0699 06A2 26 0003  01546  SOMWH    LB     3
     069A 06B1 1A 007A  01547           LBL    PB50
     069B 06B8 0F
     069C 069C 22 0003  01548           SB     3
     069D 0625 39 0600  01549  SENDCL   TLB    SEND2
     069E 06A7 34
     069F 0693 FF
               6A0      01550  DELAYL   EQU    *
     06A0 06C9 18 0053  01551           LBL    PAC2
     06A1 0614 CD
     06A2 06C2 40 0020  01552           LAI    0
     06A3 06A9 3C 0009  01553           X
               6A4      01554  DELAY2   EQU    *
     06A4 06B4 18 0058  01555           LBL    PAC2
     06A5 069A 0D
     06A6 06AD 50 0000  01556           L
     06A7 06B6 61 0001  01557           AISK   1
     06A8 06EB 39 0700  01558           TLB    DELAYEH
     06A9 069D 33
     06AA 06AE FF
     06AB 06B7 5C 0000  01559           X
     06AC 069B 93 07F1  01560           TM     TIME
     06AD 062D CB 06A4  01561           T      DELAY2
     06AE 05A6 83 07D3  01562  TIMEB    TM     SECZRO          ZERO TRPCMPLT DEBOUNCE COUNTER
     06AF 05B3 05       01563  TIM      RC
     06B0 0699 19 0079  01564  TIMN     LBL    SECTR
```

What is claimed is:

1. For controlling the transfer of data in a multiprocessor postage metering system including a system processor, a scale subsystem processor for providing scale weight and status data and a postage printing system processor for accepting postage printer setting data and for providing printer status data, a data communications system comprising:

attention lines connecting the system processor to the scale subsystem processor and the postage printer subsystem processor for enabling the system processor to initiate communications with a selected one of the subsystem processors by transmission of an attention signal to the selected processor;

acknowledgement lines connecting the scale subsystem processor and the postage printer system processor to the system processor to enable a selected one of the subsystem processors to acknowledge receipt of an attention signal from said system processor;

ready lines connecting the scale subsystem processor, and the postage printer subsystem processor to the system processor for conditioning a selected processor to accept data transmitted from another selected processor; and a serial data bus common to all of the processors in the system for carrying data between communicating processors.

2. A multiprocessor postage metering system including a weighing scale, a peripheral I/O device, and a postage printer comprising:

(a) a system processor;

(b) a keyboard and display operatively connected to said system processor;

(c) a scale subsystem processor operatively connected to said weighing scale for providing a signal indicative of scale weight and status data, said scale subsystem processor adapted to receive signals from said weighing scale;

(d) a postage printing subsystem processor operatively connected to said postage printer, which postage printing subsystem processor is adapted for accepting postage printer setting data from said system processor and for providing printer status data thereto;

(e) a peripheral subsystem processor operatively connected to said peripheral I/O device for accepting postage data from said system processor and for providing said postage data to said peripheral I/O device; and (f) a common serial data bus operatively connected to each of said system processor, said scale subsystem processor, said postage printing subsystem processor and said peripherals subsystem processor, said common serial data bus comprising a data line and a ready line.

3. The data communications system in accordance with claim 2 wherein said peripherals subsystem processor is operatively connected to said peripheral I/O device by means of a parallel data bus connected therebetween.

* * * * *